US007093745B2

(12) United States Patent
Nakamura et al.

(10) Patent No.: US 7,093,745 B2
(45) Date of Patent: Aug. 22, 2006

(54) METHOD OF AND APPARATUS FOR FRICTION STIR WELDING

(75) Inventors: Hideo Nakamura, Sakado (JP);
Tokiyuki Wakayama, Hiki-gun (JP);
Noriaki Ishii, Utsunomiya (JP);
Tutomu Asaina, Kawagoe (JP);
Masaru Odajima, Hiki-gun (JP);
Masahiko Natsuume, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 184 days.

(21) Appl. No.: 10/758,500

(22) Filed: Jan. 14, 2004

(65) Prior Publication Data

US 2004/0144832 A1    Jul. 29, 2004

(30) Foreign Application Priority Data

Jan. 14, 2003   (JP)   ............................ 2003-006147
Jan. 14, 2003   (JP)   ............................ 2003-006156

(51) Int. Cl.
*B23K 20/12*   (2006.01)
(52) U.S. Cl. .................................... 228/112.1; 228/2.1
(58) Field of Classification Search ............ 228/112.1, 228/2.1, 212, 216; 219/55, 61.1, 67; 428/593
See application file for complete search history.

(56) References Cited

U.S. PATENT DOCUMENTS

| 2,362,505 | A | * | 11/1944 | Smith ........................... 228/50 |
| 2,380,071 | A | * | 7/1945 | Planett ....................... 228/56.3 |
| 3,229,884 | A | * | 1/1966 | Franklin et al. ............... 228/50 |
| 5,769,306 | A | * | 6/1998 | Colligan ................... 228/112.1 |
| 5,971,247 | A | * | 10/1999 | Gentry ..................... 228/112.1 |
| 5,979,742 | A | * | 11/1999 | Enomoto et al. ......... 228/112.1 |
| 6,070,784 | A |   | 6/2000 | Holt et al. |
| 6,257,479 | B1 | * | 7/2001 | Litwinski et al. ........ 228/112.1 |
| 6,484,924 | B1 |   | 11/2002 | Forrest |
| 2001/0015369 | A1 |   | 8/2001 | Litwinski et al. |
| 2002/0142183 | A1 | * | 10/2002 | Colligan ..................... 428/593 |

FOREIGN PATENT DOCUMENTS

| EP | 0803314 A2 | 10/1997 |
| JP | 10-052769 | 2/1998 |
| JP | 10-202374 | 8/1998 |
| JP | 10-225780 | 8/1998 |

(Continued)

OTHER PUBLICATIONS

Japanese Office Action, Japanese No. 2003-006147, dated Dec. 27, 2005.

*Primary Examiner*—Kevin Kerns
*Assistant Examiner*—Michael Aboagye
(74) *Attorney, Agent, or Firm*—Lahive & Cockfield, LLP; Anthony A. Laurentano, Esq.

(57) ABSTRACT

A body member and flange members are butted together at a first abutment portion and a second abutment portion. The first and second abutment portions are held by first and second backing jigs, respectively. The first backing jig has a circumscribing recessed section corresponding to an inner circumferential surface of the first abutment portion. Further, the first backing jig has a circumscribing opening communicated with the bottom of the recessed section. On the other hand, the second backing jig has a circumscribing recessed section corresponding to an inner circumferential surface of the second abutment portion. Further, the second backing jig has a circumscribing opening communicated with the bottom of the recessed section. First and second buffer members are attached to the recessed sections, respectively.

24 Claims, 20 Drawing Sheets

FOREIGN PATENT DOCUMENTS

| | | |
|---|---|---|
| JP | 11-005179 | 1/1999 |
| JP | 11-010364 | 1/1999 |
| JP | 11-226759 | 8/1999 |
| JP | 2000-153377 | 6/2000 |
| JP | 2000/158154 | 6/2000 |
| JP | 2000-334576 | 12/2000 |
| JP | 2001-237621 | 8/2001 |

* cited by examiner

METHOD OF AND APPARATUS FOR FRICTION STIR WELDING

BACKGROUND OF THE INVENTION

1. Field of the Invention

The present invention relates to a method of and an apparatus for friction stir welding for joining an abutment portion by moving a rotating probe relatively along the abutment portion while pressing the probe against one surface of the abutment portion at which an end of a first plate member and an end of a second plate member are butted together.

2. Description of the Related Art

The friction stir welding (hereinafter referred to as "FSW" as well) is known, in which two workpieces are joined in solid phase by utilizing the frictional heat which is generated when a rotating probe is inserted into the workpieces. When FSW is carried out, the joined portion of the workpiece can maintain a strength which is about 80% of that of the base material, and it is also possible to prevent crystals from becoming coarse.

If the welding is performed by means of the conventional spot welding or the conventional electron beam welding by using an aluminum material as the workpiece, for example, some excessive heat is applied to the aluminum material. Therefore, the strength may be decreased due to deterioration of the material and/or change of crystals into coarse microstructure.

In contrast, the joining by FSW is performed at about 500° C., the material is prevented from the deterioration which would be otherwise caused by the heat, even when a metal material such as the aluminum material having a relatively low melting point (about 600° to 660° C. in the case of the aluminum material) is used. Therefore, FSW is also applicable to other materials such as magnesium, titanium, and polymer as well as the aluminum material.

As an example of the application of FSW to the aluminum material, an aluminum frame of a large member such as an electric train may be exemplified. In the case of such a large member, the joining strength is important, and hence the thickness of the aluminum material is usually not less than 5 mm. On the other hand, if light weight is desired as well as the improvement of strength in the case of gas turbine engine members or the like, it is difficult to increase the thickness of each component. For this reason, for example, a thin plate aluminum material of about 1.2 mm thickness is used to construct an outer frame of the gas turbine engine.

However, when an abutment portion, at which both ends of thin plate-shaped aluminum materials are butted together, is joined by means of FSW to form a cylindrical member having a relatively large diameter, it is difficult to obtain a satisfactory circularity or roundness because the aluminum material is thin.

Further, when an abutment portion, at which ends of two cylindrical members are butted together, is joined by FSW, the circumferential lengths of the respective ends may not be the same. If the cylindrical members are joined in this state by FSW, then the difference in phase appears at the final position of the joined portion, and for example, the shape is deformed in a wavy form, resulting in wrinkles or corrugations.

Furthermore, when the aluminum material is thin plate, unjoined portion tends to appear when the abutment portion is joined by FSW. Specifically, as shown in FIG. 19, when a rotating probe P is inserted into an abutment portion T where aluminum materials W1, W2 are butted together, an unjoined portion U may appear at the abutment portion T due to shortage of friction stir caused by the failure of arrival of the probe tip Pa.

Moreover, the circumferential speed of the probe P is slowed down as the position approaches the probe tip Pa. The area S, which is subjected to the friction stir, is restricted or reduced in the vicinity of the probe tip Pa due to the decrease in circumferential speed. As a result, the frictional heat is insufficient, and the unjoined portion U appears. Because the unjoined portion U may be a fracture origin, structural reliability is deteriorated.

Additionally, the pressing force of 1 t to 2 t is applied to the thin plate aluminum materials W1, W2 during the joining by FSW. Therefore, some irregularity may appear at the joined portion as a result of FSW, if the aluminum materials W1, W2 are not retained reliably.

In view of the above, Japanese Laid-Open Patent Publication No. 11-226759 describes a method of joining aluminum members as shown in FIG. 18, for example. A backing member 3 of the same material as that of hollow tubes (plate members) 1a, 1b is arranged at the inside of an abutment portion 2 of the hollow tubes 1a, 1b made of aluminum. A predetermined interstice or clearance C is formed between the backing member 3 and the inner surface of the abutment portion 2.

In this arrangement, a probe tip 4a of a probe 4 is inserted into the abutment portion 2 and the backing member 3 while rotating the probe 4 at a high speed, and the probe 4 is moved along the abutment portion 2. Accordingly, the entire circumference of the circumscribing abutment portion 2 is welded by the friction stir welding.

In the case of Japanese Laid-Open Patent Publication No. 11-226759, the backing member 3 is provided as a reinforcing member of the hollow tubes 1a, 1b, and the reinforcing member is joined to the inner surfaces of the hollow tubes 1a, 1b. However, the hollow tubes 1a, 1b, to which the backing member 3 is joined as described above, cannot be used, as an outer frame of a gas turbine engine, for example. Therefore, it is necessary to exfoliate the backing member 3 from the inner surfaces of the hollow tubes 1a, 1bafter joining the hollow tubes 1a, 1b. In particular, when the thickness of the hollow member 1a, 1b is small, strain or distortion appears due to the exfoliation treatment of the backing member 3. Further, the backing member 3 may be broken during the exfoliation, and cannot be used repeatedly if broken. Therefore, it is not economical.

Another method is described in Japanese Laid-Open Patent Publication No. 10-225780 as a method of producing an abutment joint. In this production method, as shown in FIG. 20, end surfaces of joining members 1a, 1b made of aluminum are butted together to provide an abutment portion 2. A backing member 3 made of aluminum is arranged on the abutment portion 2. A recess 3a, which has a circular arc-shaped cross section, is formed on a surface of the backing member 3.

In this arrangement, a rotor 4 and a probe 5 are rotated, and the probe 5 is inserted into the abutment portion 2 of the joining members 1a, 1b. Accordingly, the abutment portion 2 of the joining members 1a, 1b is deformed to protrude on the back surface along the recess 3a of the backing member 3. When the probe 5 is moved along the abutment portion 2 with the probe 5 inserted into the abutment portion 2, the abutment portion 2 is subjected to the friction stir welding over the entire length of the abutment portion 2. Subsequently, a deformed portion 6, which is deformed to protrude toward the recess 3a of the backing member 3, is cut off by using, for example, a milling machine to obtain a flat surface.

However, in the case of the technique described in Japanese Laid-Open Patent Publication No. 10-225780, it is necessary to insert the probe 5 to the back surface of the abutment portion 2, in order that the abutment portion 2 is deformed on the back surface side to protrude toward the recess 3a of the backing member 3. For this reason, especially when each of the joining members 1a, 1b has a small thickness, breakage may occur in the joining members 1a, 1b.

Further, it is necessary to exfoliate the backing member 3 from the back surface of the abutment portion 2 after the joining process. Therefore, when the joining members 1a, 1b are thin as described above, residual strain appears as a result of the exfoliation treatment of the backing member 3.

Also in this case, the backing member 3 may be broken during exfoliation, and cannot be used repeatedly if broken. Therefore, it is not economical.

SUMMARY OF THE INVENTION

A general object of the present invention is to provide a method of and an apparatus for friction stir welding in which especially thin plate members are joined to one another and any unjoined portion is reliably removed to successfully maintain joining strength.

A principal object of the present invention is to provide a method of and an apparatus for friction stir welding in which the process is economical and the occurrence of residual strain can be effectively avoided.

Another object of the present invention is to provide a method of and an apparatus for friction stir welding in which any unjoined portion can be reliably removed and the strength of the joined portion is effectively increased, making it possible to improve the reliability.

Still another object of the present invention is to provide a method of and an apparatus for friction stir welding in which no residual strain appears in a first plate member and a second plate member when a backing jig and a buffer member are disengaged.

Still another object of the present invention is to provide a method of and an apparatus for friction stir welding in which the dimensional accuracy of the product is improved and the friction stir welding process can be efficiently carried out.

Still another object of the present invention is to provide a method of and an apparatus for friction stir welding in which the entire circumference of an abutment portion can be welded suitably.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
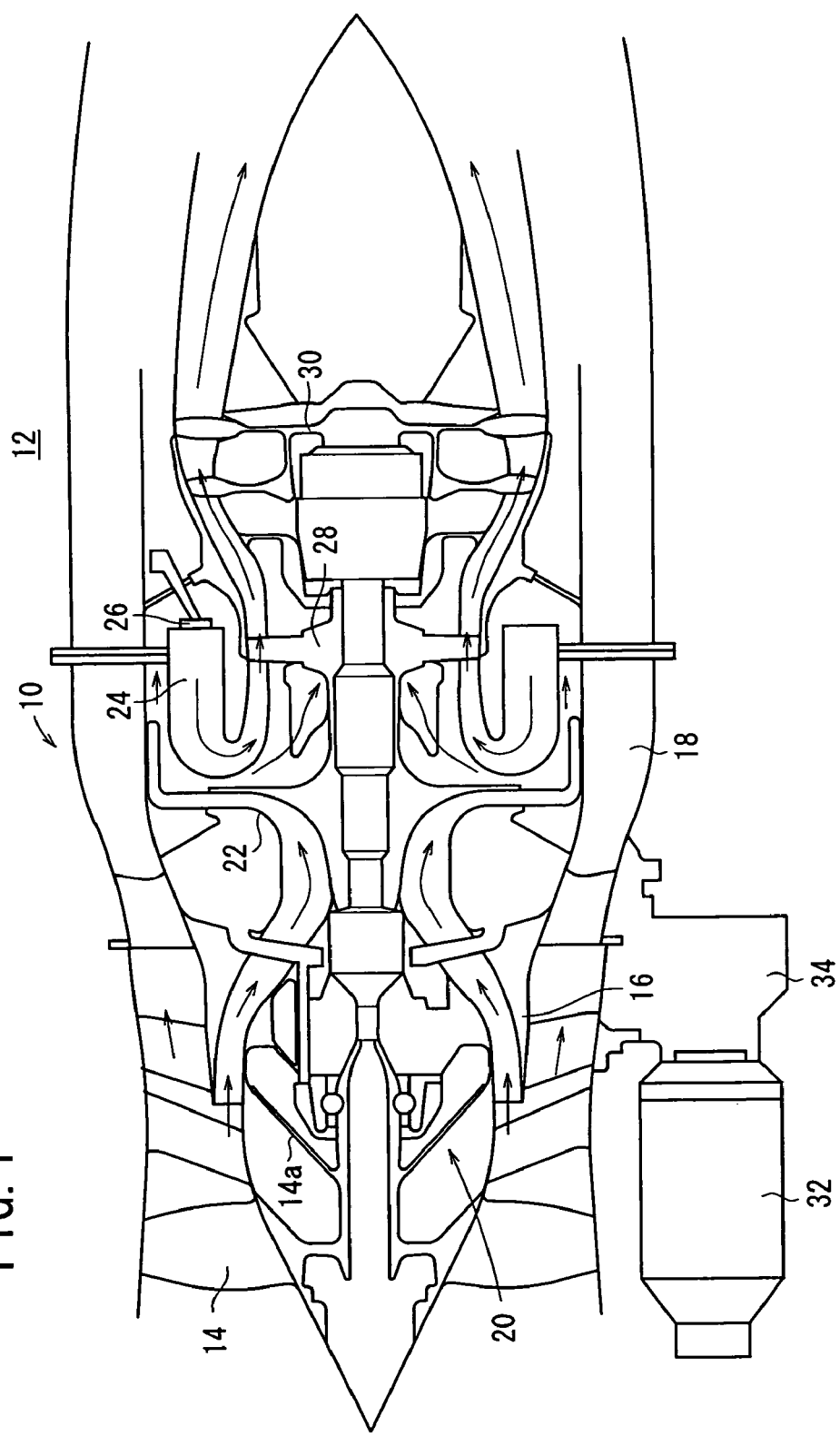
FIG. 1 schematically illustrates a structure of a gas turbine engine of an airplane.

FIG. 1 schematically illustrates a structure of a gas turbine engine 12 for an airplane into which a fan duct 10 is incorporated. A friction stir welding method according to a first embodiment of the present invention is carried out especially for the fan duct 10.

The gas turbine engine 12 is provided with a fan 14. The fan 14 is rotated at a high speed to suck the air from the outside. The air is compressed, and fed to the backward under pressure. A fan bypass passage 18 is formed by a core duct 16 and the fan duct 10 in the vicinity of the fan 14. A thrust force is generated for an unillustrated airframe by the air which is jetted backwardly through the fan bypass passage 18.

The fan 14 is a part of a low pressure compressor 20. The air compressed by the low pressure compressor 20 is fed to a high pressure compressor 22 disposed on the downstream side. The air compressed by the high pressure compressor 22 is further fed to a combustion chamber 24 disposed on the downstream side. The combustion chamber 24 is provided with a fuel nozzle 26. The fuel is fed under pressure from the fuel nozzle 26 to the combustion chamber 24. An air-fuel mixture, which is obtained by mixing the compressed air fed under pressure from the high pressure compressor 22 and the fuel injected from the fuel nozzle 26, is ignited and burned in the combustion chamber 24 upon the start-up of the engine.

The combustion of the air-fuel mixture produces the high temperature and high pressure gas. The high temperature and high pressure gas is fed to a high pressure turbine 28 to rotate the high pressure turbine 28 at a high speed. The high pressure turbine 28 rotates a rotor 14a of the fan 14. On the other hand, the high temperature and high pressure gas is fed to a low pressure turbine 30 after the gas drives and rotates the high pressure turbine 28. The low pressure turbine 30 rotates the fan 14 and the rotor 14a of the low pressure compressor 20.

A starter generator 32, into which a starter and a generator are incorporated, is attached to an outer lower surface of the gas turbine engine 12 by an accessory gear box 34.

Figure 2:
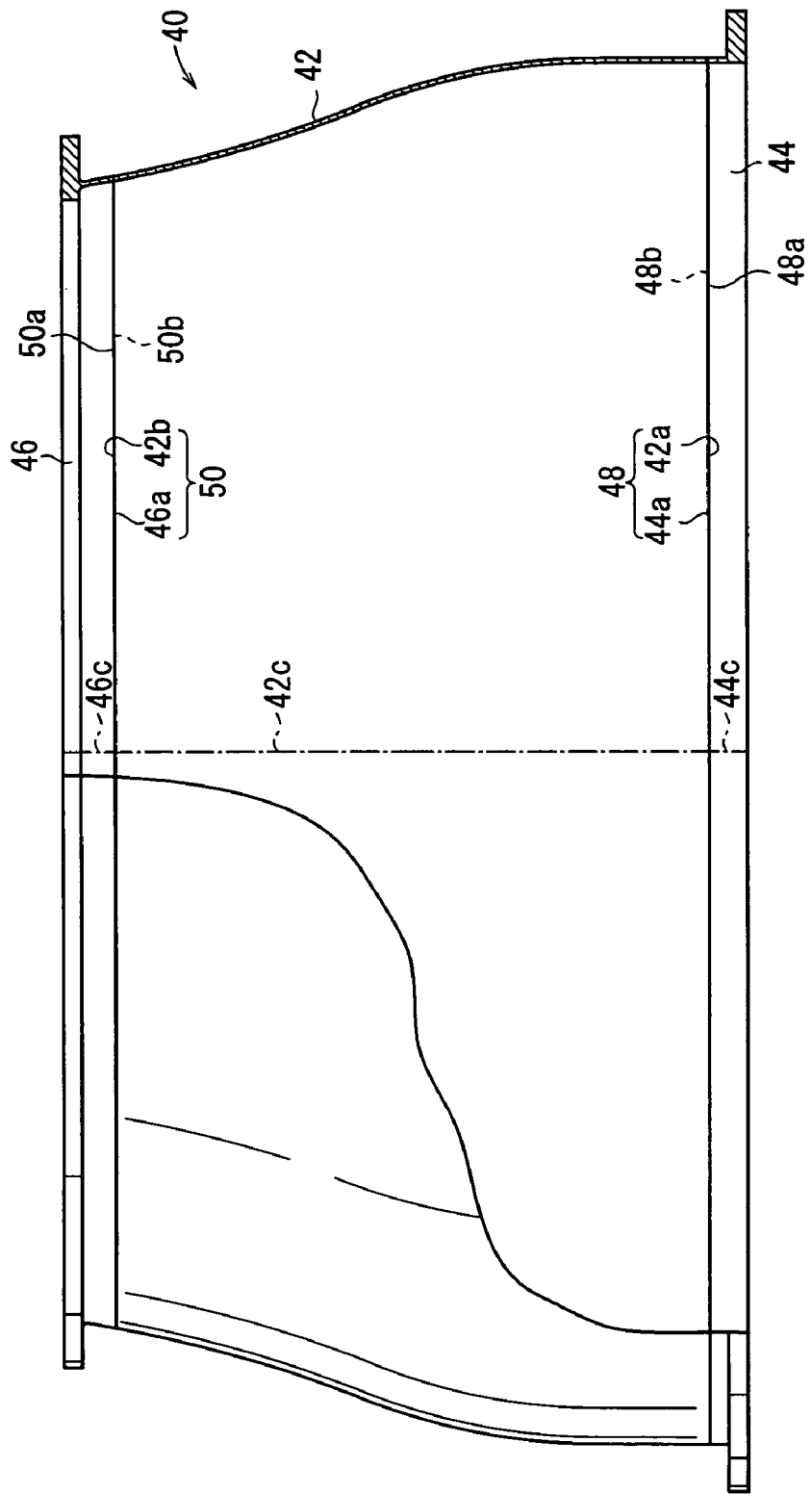
FIG. 2 illustrates a duct structure of a fan duct shown in FIG. 1.

FIG. 2 illustrates a duct structure 40 of the fan duct 10. The duct structure 40 comprises a body member (first plate member) 42 which is obtained by forming a thin plate aluminum material having a thickness of, for example, not more than 2 mm into a substantially cylindrical shape, and flange members (second plate members) 44, 46 each of which is obtained by forming a thin plate aluminum material into a substantially cylindrical shape. An end 42a of the body member 42 abuts an end 44a of the flange member 44 at a first abutment portion 48 while an end 42b of the body member 42 abuts an end 46a of the flange member 46 at a second abutment portion 50. The first and second abutment portions 48, 50 are subjected to the friction stir welding on their outer circumferential surfaces (first surfaces) 48a, 50a to join the body member 42 and the flange members 44, 46.

Figure 3:
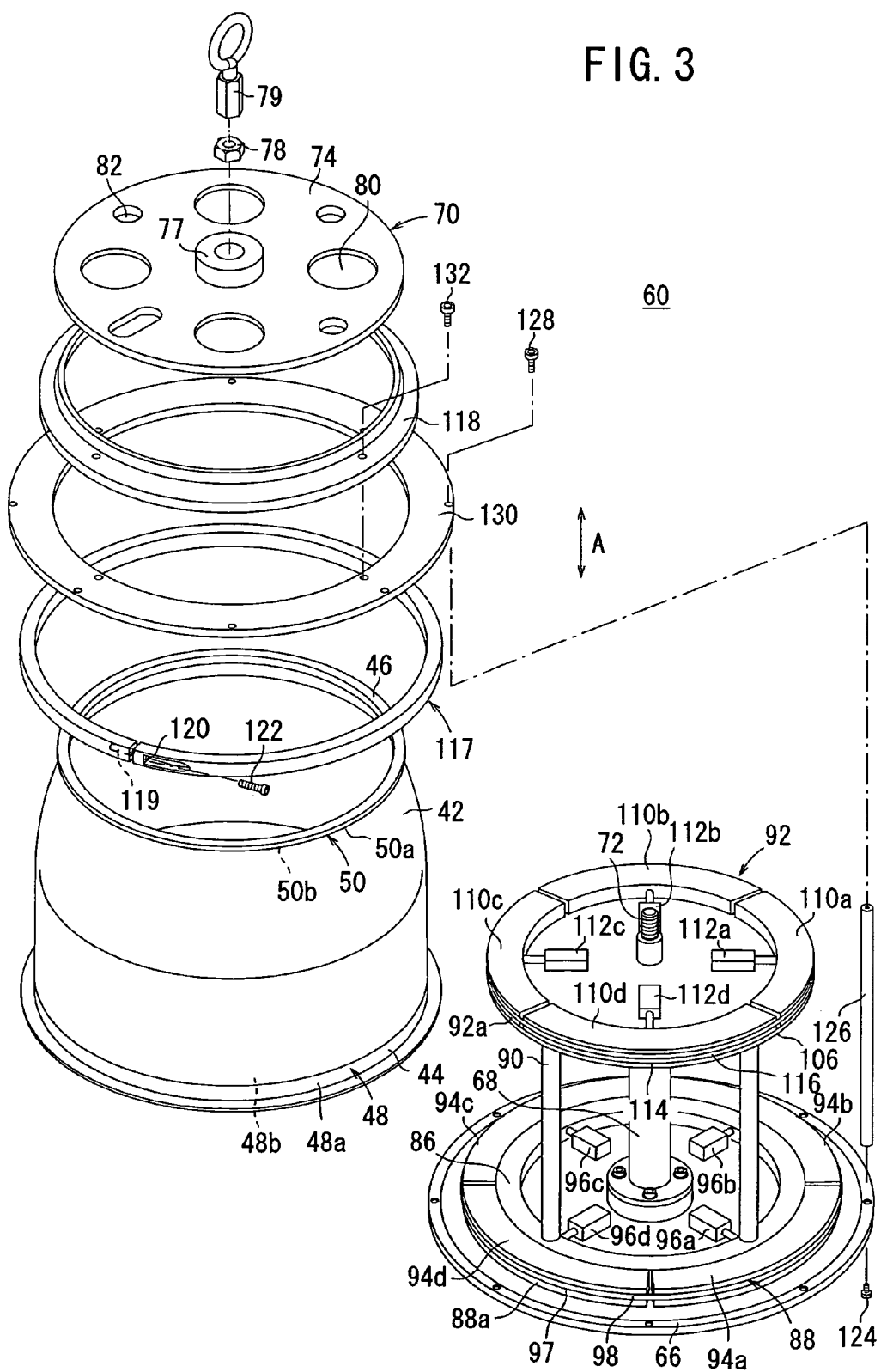
FIG. 3 is a partial exploded perspective view illustrating a friction stir welding apparatus according to a first embodiment of the present invention for joining the duct structure shown in FIG. 2.
Figure 4:
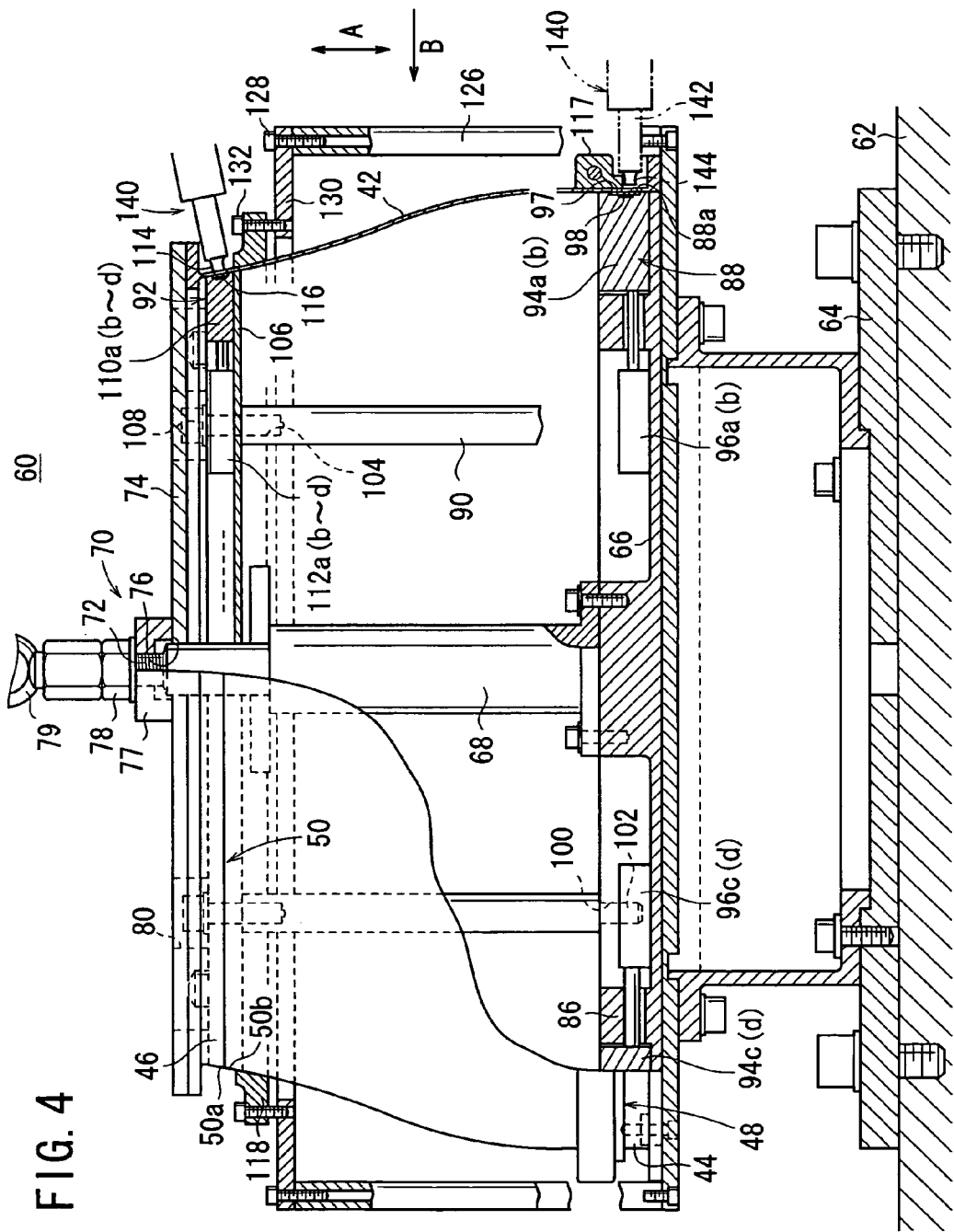
FIG. 4 is a sectional view illustrating the friction stir welding apparatus shown in FIG. 3.
Figure 5:
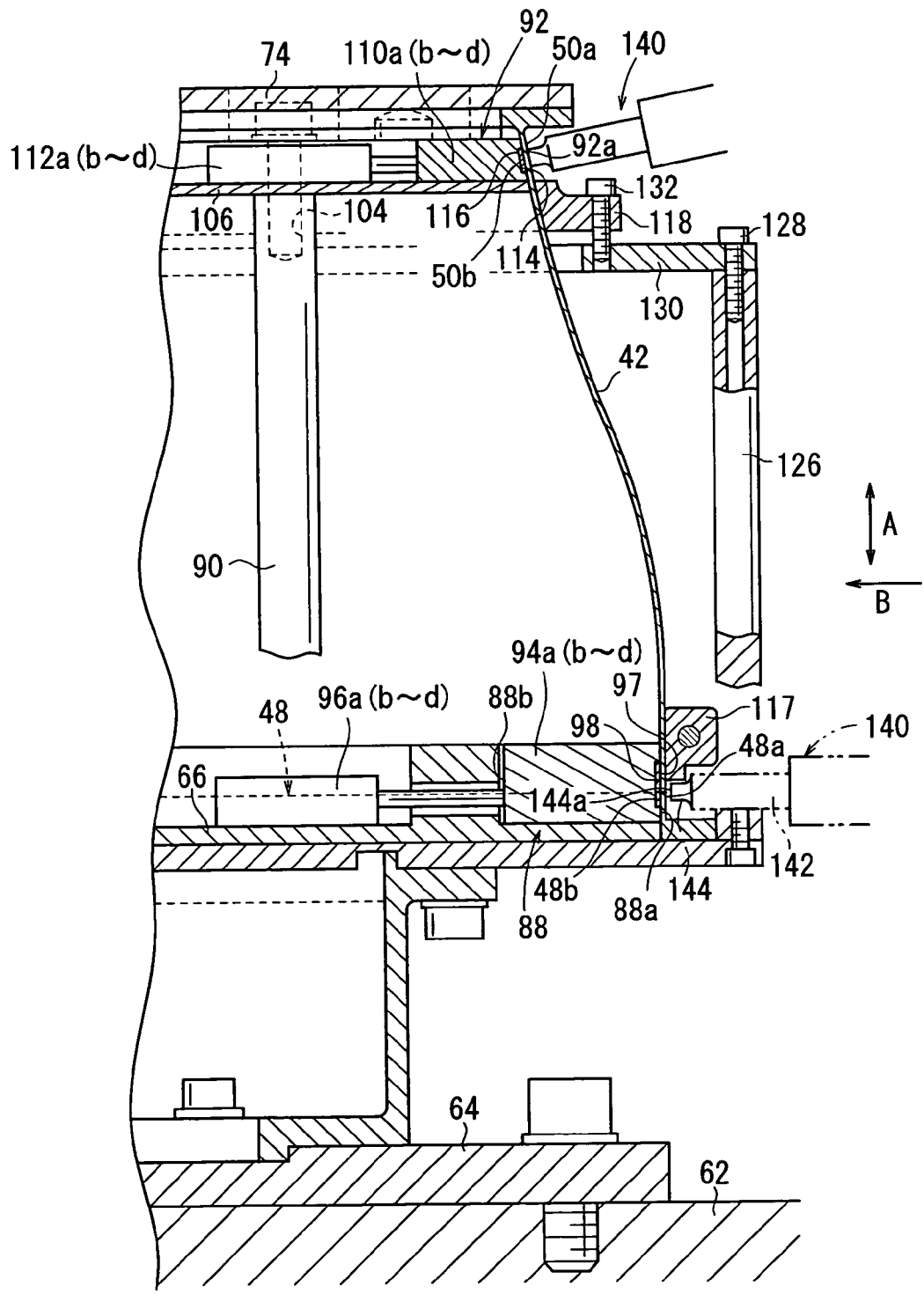
FIG. 5 is a magnified view illustrating a part of the friction stir welding apparatus shown in FIG. 4.

FIG. 3 shows a partial exploded perspective view illustrating a friction stir welding apparatus 60 according to the first embodiment of the present invention for performing the friction stir welding of the duct structure 40, and FIG. 4 illustrates a sectional view illustrating the friction stir welding apparatus 60. FIG. 5 illustrates a magnified view illustrating a part of the friction stir welding apparatus 60.

The friction stir welding apparatus 60 is provided with a pedestal member 64 which is rotatable while being fixed to a rotary table 62 and which integrally holds the body member 42 and the flange members 44, 46 previously joined to one another temporarily. A substantially disk-shaped support base 66 is secured over the pedestal member 64. A support pillar 68, which extends in the vertical direction (directions of the arrow A), is provided at a central portion of the support base 66. A screw section 72 of a pressing mechanism 70 is formed at the end of the support pillar 68.

The pressing mechanism 70 includes a substantially disk-shaped pressing plate 74. A hole 76 for inserting the support pillar 68 thereinto is formed at a central portion of the pressing plate 74. The pressing plate 74 functions to apply the pressing force to the body member 42 and the flange members 44, 46 arranged on the support base 66 in directions of the arrow A substantially perpendicular to a direction of insertion (direction of the arrow B) of a probe 144 (see FIG. 6) as described later on.

A pressing block 77 is engaged with the central portion of the pressing plate 74. A nut member 78, which is screwed with the screw section 72, presses the pressing plate 74 in the directions of the arrow A by the pressing block 77. A hanging bolt 79 is screwed to the end of the screw section 72. The pressing plate 74 is formed with a plurality of openings 80 which are separated from each other by equal angles, and a plurality of openings 82 which have diameters smaller than those of the openings 80.

A ring section 86, which extends in a circumscribing form about the center of the support pillar 68, is formed for the support base 66 so that the ring section 86 is expanded in the directions of the arrow A. A first backing jig 88 is detachably provided on the outer circumference of the ring section 86. A second backing jig 92 is attached by rods 90 which are fixed to the ring section 86.

The first backing jig 88 is provided with a plurality of (for example, four) divided jigs 94a to 94d each of which is formed of, for example, an iron-based material. The first backing jig 88 is substantially ring-shaped as a whole. The divided jigs 94a to 94d are connected to actuators such as cylinders 96a to 96d. Accordingly, the divided jigs 94a to 94d are constructed so that they are movable back and forth individually in the radial directions.

Figure 6:
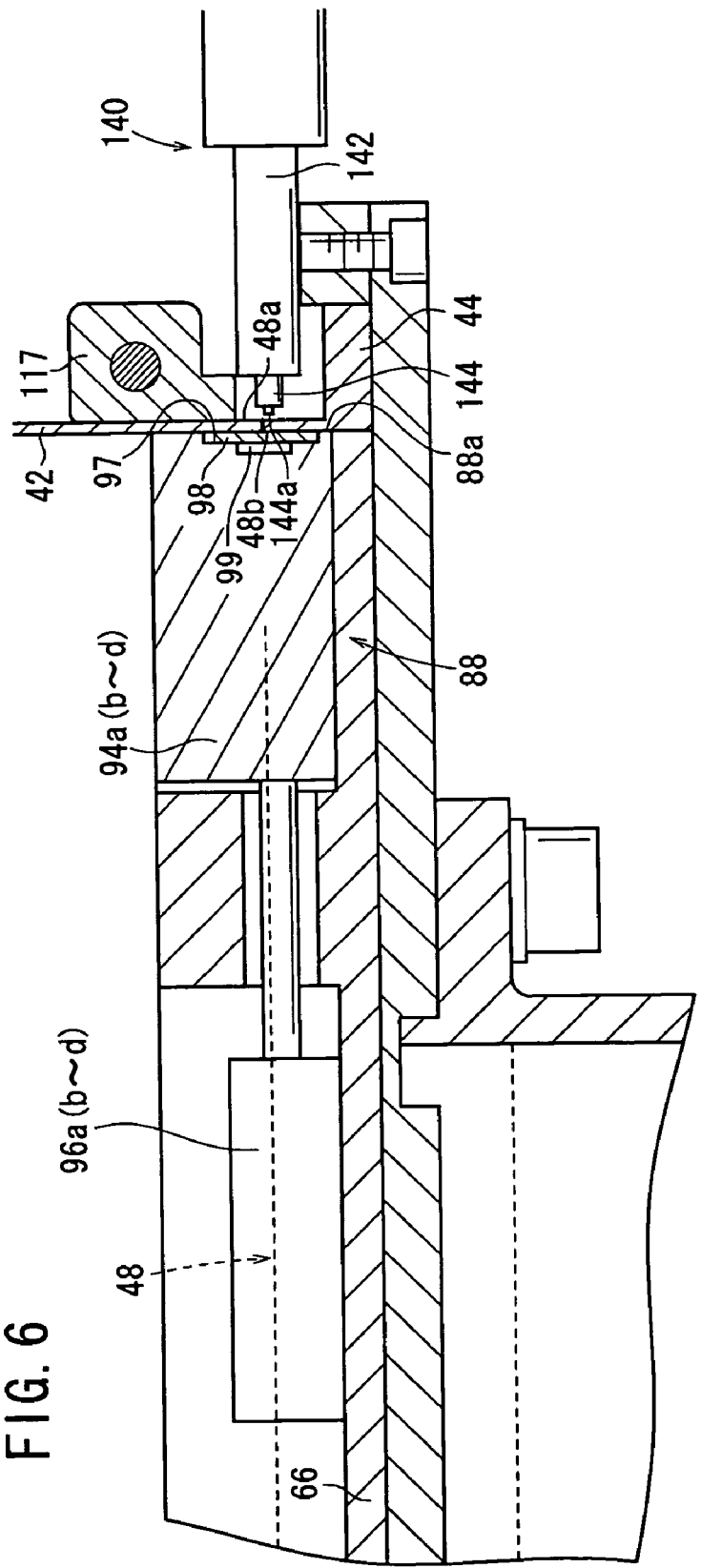
FIG. 6 is a magnified view illustrating a first backing jig.

The first backing jig 88 has an outer circumferential surface 88a which is designed to be completely circular. As shown in FIG. 6 which illustrates a magnified view of the first backing jig 88, the outer circumferential surface 88a has a circumscribing recessed section 97 which is provided corresponding to an inner circumferential surface (second surface) 48b of the first abutment portion 48 at which the body member 42 and the flange member 44 are butted together. A circumscribing opening 99, which is communicated with the bottom of the recessed section 97, is formed on the outer circumferential surface 88a.

A first buffer member 98 is attached to the recessed section 97. The first buffer member 98 is disengaged from the inner circumferential surface 48b of the first abutment portion 48 after performing the friction stir welding for the first abutment portion 48. The first buffer member 98 is a ring member made of, for example, an iron-based material or aluminum. The first buffer member 98 has a thickness which is in the same dimension as the depth of the recessed section 97, for example, about 1 mm.

The opening 99 is a recessed groove which circumscribes the outer circumferential surface 88a of the first backing jig 88 and has a width narrower than that of the recessed section 97. The opening 99 has a size capable of accommodating an area which tends to form any unjoined portion after the friction stir welding for the inner circumferential surface 48b of the first abutment portion 48. When the unjoined portion is 20 μm to 30 μm, for example, the depth of the opening 99 is about 50 μm.

As shown in FIG. 4, screw holes 100, which are separated from each other by predetermined angular intervals, are formed on the upper surface of the ring section 86. Screw sections 102, which have first ends provided with the respective rods 90, are screwed with the screw holes 100. Screw holes 104 are formed at second ends of the rods 90. When bolts 108 are screwed from an attachment plate 106 of the second backing jig 92, the attachment plate 106 is fixed to the rods 90.

As shown in FIGS. 3 and 4, the second backing jig 92 is provided with a plurality of (for example, four) divided jigs 110a to 100d each of which is formed of, for example, an iron-based material. The second backing jig 92 is substantially ring-shaped as a whole. The divided jigs 110a to 110d are connected to actuators, for example, cylinders 112a to 112d. The divided jigs 110a to 110d are constructed so that they are movable back and forth individually in the radial directions on the attachment plate 106.

Figure 7:
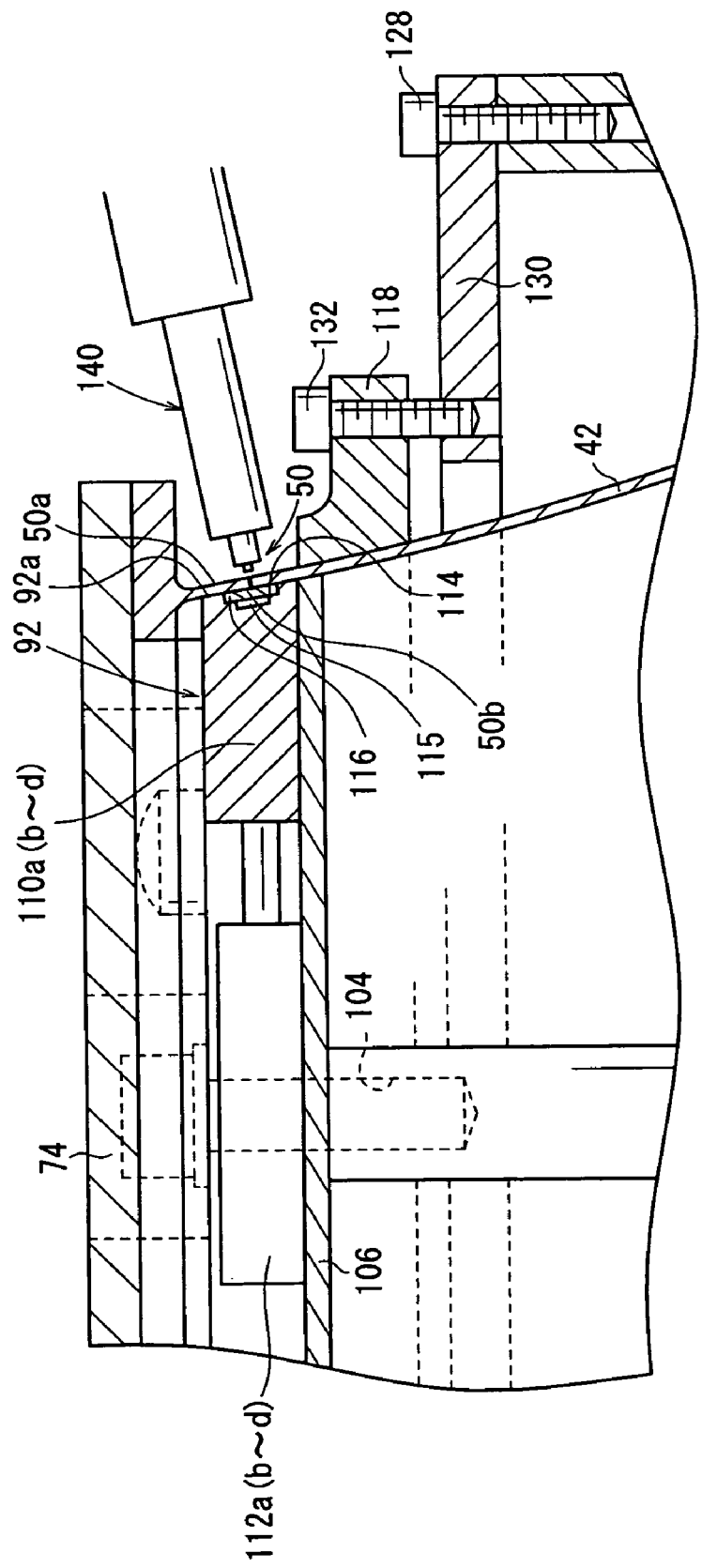
FIG. 7 is a magnified view illustrating a second backing jig.

The second backing jig 92 has an outer circumferential surface 92a which is formed to be completely circular as a whole. As shown in FIG. 7 which illustrates a magnified view of the second backing jig 92, the outer circumferential surface 92a has a circumscribing recessed section 114 which is provided corresponding to an inner circumferential surface (second surface) 50*b* of the second abutment portion 50 at which the body member 42 and the flange member 44 are butted together. A circumscribing opening 115, which is communicated with the bottom of the recessed section 114, is also formed on the outer circumferential surface 92*a*.

A second buffer member 116 is attached to the recessed section 114, and is disengaged from the inner circumferential surface 50b of the second abutment portion 50 after performing the friction stir welding for the second abutment portion 50. The second buffer member 116 is a ring member made of, for example, an iron-based material or aluminum. The second buffer member 116 has a thickness which is in the same dimension as the depth of the recessed section 114, for example, about 1 mm.

The opening 115 is formed to be a recessed groove which circumscribes the outer circumferential surface 92*a* of the second backing jig 92 and which has a width narrower than that of the recessed section 114. The opening 115 is designed to have such a size capable of accommodating an area which tends to form any unjoined portion after the friction stir welding for the inner circumferential surface 50*b* of the second abutment portion 50.

As shown in FIGS. 3 and 4, taking the spring back of the duct structure 40 into consideration, it is necessary that the duct structure 40 is maintained to finally have a designed size in relation to the outer circumferential surface 88*a* of the first backing jig 88 and the outer circumferential surface 92*a* of the second backing jig 92. Therefore, the maximum outer diameter of the outer circumferential surface 88*a*, which is obtained when the first backing jig 88 is diametrally expanded, is larger than the inner diameter of the first abutment portion 48 before being heated. Further, the maximum outer diameter of the outer circumferential surface 92*a*, which is obtained when the second backing jig 92 is diametrally expanded, is larger than the inner diameter of the second abutment portion 50 before being heated.

A first clamp jig 117, which holds the first abutment portion 48, is arranged on the outer circumferential surface 48a of the first abutment portion 48. On the other hand, a second clamp jig 118, which holds the second abutment portion 50, is arranged on the outer circumferential surface 50*a* of the second abutment portion 50.

As shown in FIG. 3, the first clamp jig 117 is formed to be belt-shaped by making a ring with a member having a square cross section. A screw hole 119 is formed at one end surface of the first clamp jig 117, and a hole 120 is formed at the other end surface. When a bolt 122 is screwed into the screw hole 119 through the hole 120, the size of the first clamp jig 117 in the radial direction is reduced to tighten the outer circumferential surface 48*a* of the first abutment portion 48.

As shown in FIGS. 3 to 5, a plurality of rods 126 are fixed to outer circumferential edge portions of the support base 66 by bolts 124. The respective rods 126 extend in the directions of the arrow A. An attachment plate 130 is provided by bolts 128 which are screwed into ends thereof. The attachment plate 130 is substantially ring-shaped. The second clamp jig 118 is fixed to the attachment plate 130 by bolts 132. The second clamp jig 118 is substantially ring-shaped, which tightens and holds the outer circumferential surface 50*a* of the second abutment portion 50.

As shown in FIG. 6, a welding machine 140 for joining the first abutment portion 48 is provided with a rotary tool 142. A probe 144 is provided at the tip of the rotary tool 142, and protrudes by a predetermined length from the end surface. The probe 144 is inserted into the first abutment portion 48 by a length of the probe tip 114*a* which is shorter than the thickness of the first abutment portion 48. The second abutment portion 50 may be joined by using the welding machine 140 described above (see FIG. 7). Alternatively, the joining operation may be performed for the second abutment portion 50 by using any other joining machine.

Figure 8:
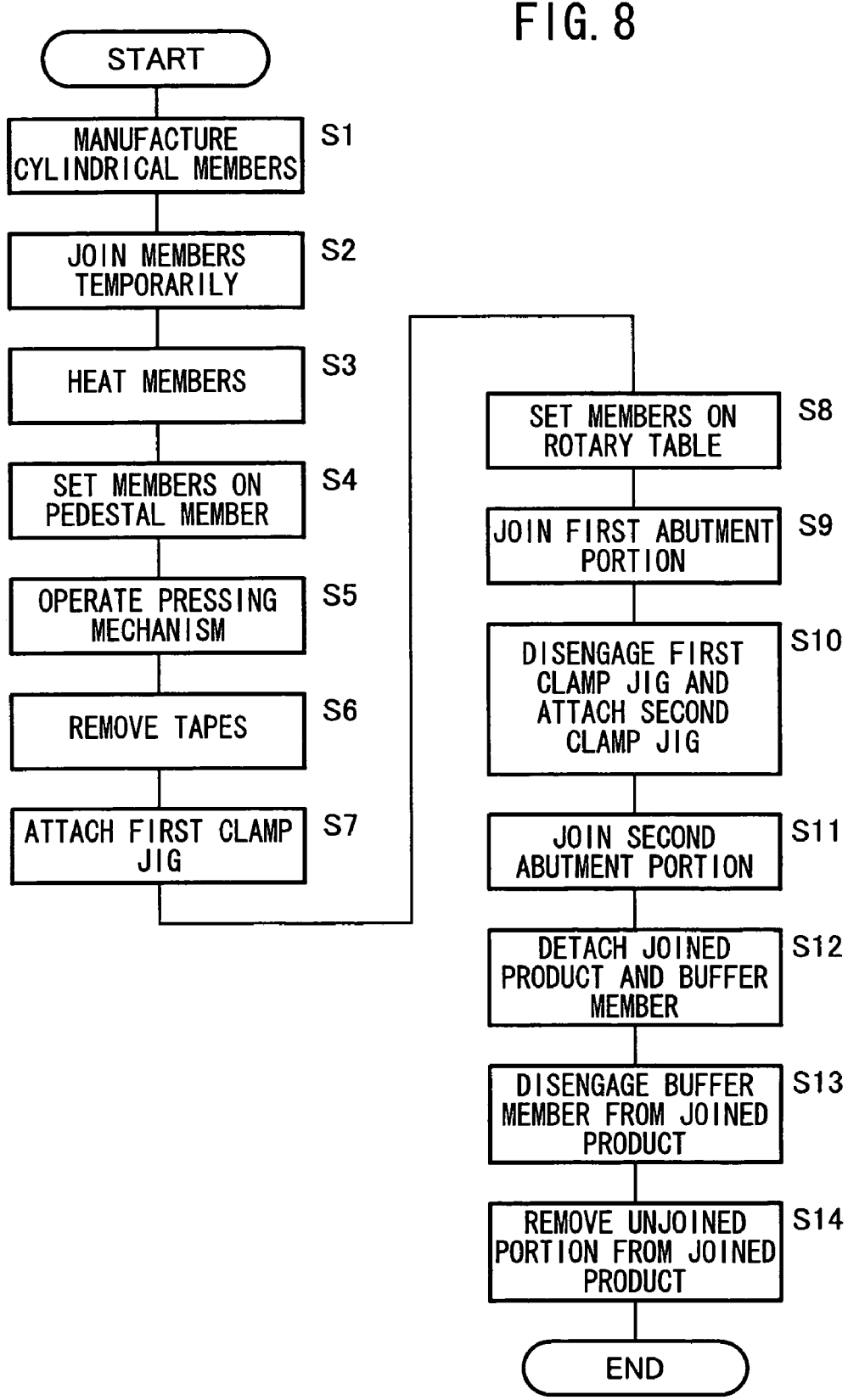
FIG. 8 is a flow chart of the friction stir welding method.

An explanation will be made below with reference to a flow chart shown in FIG. 8 about the operation of the friction stir welding apparatus 60 constructed as described above in relation to the friction stir welding method according to the first embodiment.

First, the body member 42 and the flange members 44, 46, each of which has the cylindrical shape, are manufactured (Step S1). Specifically, as shown in FIG. 2, a thin plate aluminum material, which is to be formed into the body member 42, is formed to the substantially cylindrical shape. The friction stir welding (FSW) is performed along an abutment portion 42*c* at which both ends of the thin plate aluminum material are butted together, and thus the abutment portion 42*c* is joined. Thus, the body member 42 is obtained.

Similarly, thin plate aluminum materials, which are to be formed into the flange members 44, 46, are formed to the substantially cylindrical shapes, and then respective abutment portions 44*c*, 46*c* is joined by means of the friction stir welding. Thus, the flange members 44, 46 are obtained.

During the friction stir welding described above, an unillustrated probe is arranged while being offset by a predetermined distance from the center of the cylindrical shape so that the joined surface is prevented from being cut.

Subsequently, aluminum tapes (not shown) are stuck to predetermined positions of the first abutment portion 48 and the second abutment portion 50 where the ends 44*a*, 46*a* of the flange members 44, 46 are butted against the ends 42*a*, 42*b* of the body member 42. Accordingly, the flange members 44, 46 are temporarily joined on both sides of the body member 42 (Step S2). The body member 42 and the flange members 44, 46, which have been temporarily joined to one another, are arranged in an unillustrated heating furnace, and heated to a predetermined temperature (Step S3). After that, the body member 42 and the flange members 44, 46 are set on the pedestal member 64 (Step S4).

Specifically, as shown in FIGS. 3 to 5, the divided jigs 94*a* to 94*d*, which circumscribe the ring section 86 and which constitute the first backing jig 88, are arranged on the inner side in the radial direction on the support base 66 of the pedestal member 64. Therefore, the outer circumferential surface 88a of the first backing jig 88 is maintained to have the minimum diameter. The cylinders 96*a* to 96*d* are driven while the first buffer member 98 is arranged corresponding to the recessed section 97 of the outer circumferential surface 88*a*. Accordingly, the divided jigs 94*a* to 94*d* are moved radially outwardly, and thus the outer circumferential surface 88*a* of the first backing jig 88 is diametrally expanded. The first buffer member 98 is pressed and held by the outer circumferential surface 88*a*.

On the other hand, the screw sections 102 of the rods 90 are screwed to the screw holes 100 formed in the ring section 86. The attachment plate 106 of the second backing jig 92 is arranged on the rods 90. The bolts 108 are screwed to the screw holes 104 of the rods 90 through the holes of the attachment plate 106. Accordingly, the attachment plate 106 is fixed to the respective rods 90. The divided jigs 110*a* to 110*d* are arranged radially inwardly.

In this state, the second buffer member 116 is arranged on the outer circumferential surface 92*a* of the second backing jig 92. The cylinders 112a to 112d are driven, and the divided jigs 110a to 110d are moved radially outwardly. Therefore, the outer circumferential surface 92a is diametrally expanded. The second buffer member 116 is pressed and held by the outer circumferential surface 92a.

The body member 42 and the flange members 44, 46, which have been heated to the predetermined temperature, are externally fitted on the first backing jig 88 and the second backing jig 92. In this situation, the body member 42 and the flange members 44, 46 are heated to the predetermined temperature, and their inner circumferential diameters are expanded by thermal expansion. Therefore, the first abutment portion 48 and the second abutment portion 50 of the body member 42 and the flange members 44, 46 are externally and easily fitted on the first buffer member 98 and the second buffer member 116 arranged on the first backing jig 88 and the second backing jig 92, respectively.

When the body member 42 and the flange members 44, 46 are cooled, the inner circumferential diameters are reduced or contracted. The inner circumferential surface 48b of the first abutment portion 48 and the inner circumferential surface 50b of the second abutment portion 50 are certainly fitted and in close contact with the outer circumferential surface 88a of the first backing jig 88 and the outer circumferential surface 92a of the second backing jig 92, i.e., the first buffer member 98 and the second buffer member 116 (see FIGS. 6 and 7). That is, as described above, the maximum outer diameter of the outer circumferential surface 88a of the first backing jig 88 is larger than the inner diameter of the inner circumferential surface 48b of the first abutment portion 48 before being heated, and the maximum outer diameter of the outer circumferential surface 92a of the second backing jig 92 is larger than the inner diameter of the inner circumferential surface 50b of the second abutment portion 50 before being heated.

In this arrangement, the outer circumferential surface 88a of the first backing jig 88 and the outer circumferential surface 92a of the second backing jig 92 are completely circular. The first buffer member 98 and the second buffer member 116 are fitted on the recessed sections 97, 114 of the outer circumferential surfaces 88a, 92a, respectively. The ends 42a, 44a and the ends 42b, 46b are in close contact with the first buffer member 98 and the second buffer member 116. The ends 42a, 44a and the ends 42b, 46b have the identical circumferential lengths and are maintained to be completely circular.

Subsequently, the pressing plate 74 is arranged on the second backing jig 92. The pressing block 77 is externally fitted on the screw section 72, and then the nut member 78 is screwed into the screw section 72. Accordingly, the pressing plate 74 is pressed by the pressing block 77, and the tightening load is applied in the directions of the arrow A to the body member 42 and the flange members 44, 46. As a result, the first abutment portion 48 and the second abutment portion 50 are pressed and retained in a state in which no gap is formed (Step S5). When the control goes to Step S6, the aluminum tapes (not shown), which have been stuck to the first abutment portion 48 and the second abutment portion 50, are removed, and the surfaces are washed.

In Step S7, the first clamp jig 117 is installed. The first clamp jig 117 is belt-shaped, and it circumscribes the outer circumference of the body member 42 at the end 42a. Accordingly, when the bolt 122 is inserted into the hole 120, and the bolt 122 is screwed into the screw hole 119, the inner circumferential diameter of the first clamp jig 117 is reduced. Therefore, the first clamp jig 117 tightens and holds the outer circumferential surface of the body member 42.

Figure 9:
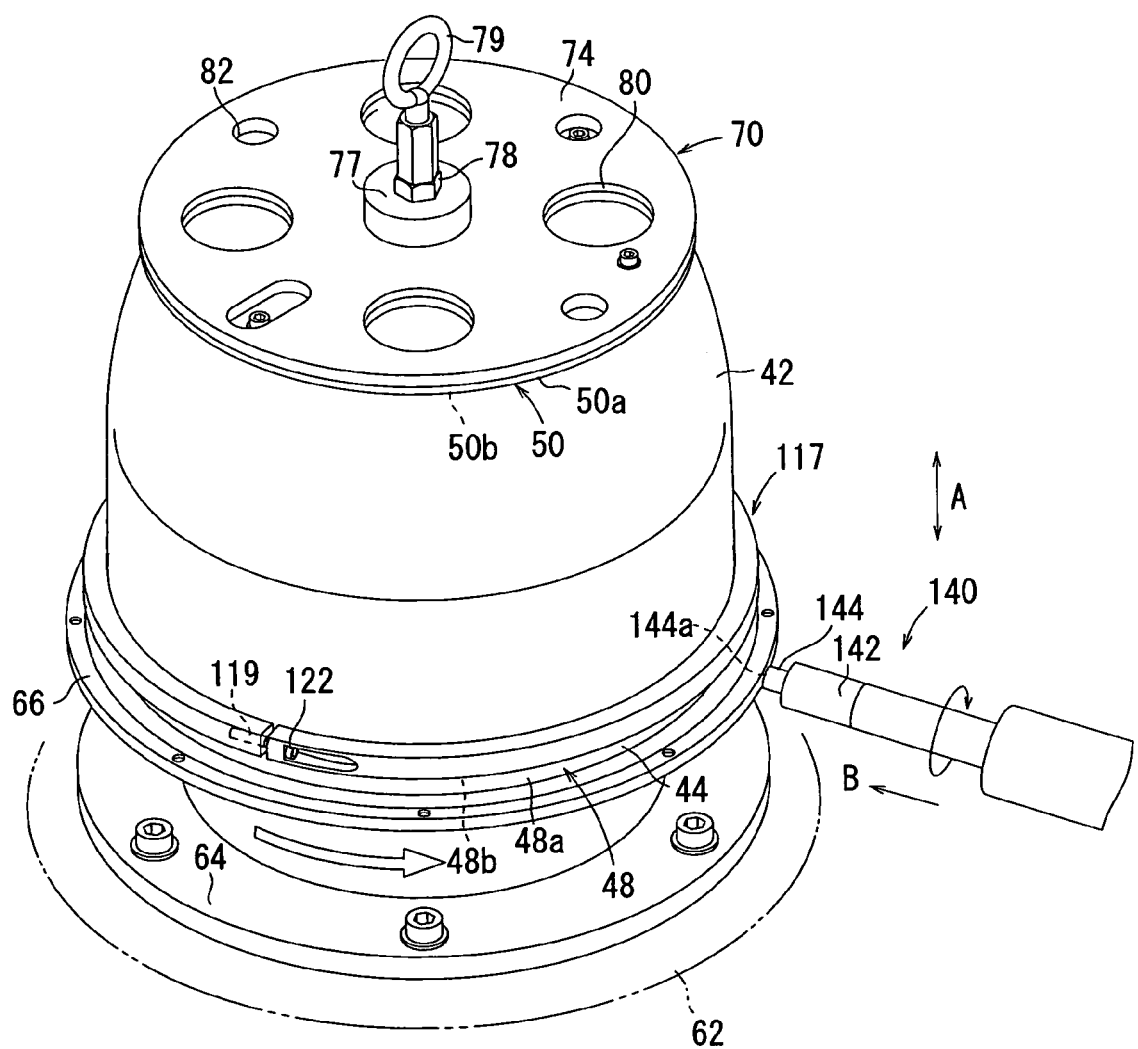
FIG. 9 illustrates the operation to be performed when a first abutment portion is joined.

Subsequently, the pedestal member 64 is fixed by being fastened with screws to the rotary table 62 (Step S8). In this state, as shown in FIG. 9, the rotary tool 142 of the welding machine 140 is moved toward the first abutment portion 48 (in the direction of the arrow B) while rotating at a high speed. The probe 144 rotating at the high speed has the probe tip 144a which is inserted into the first abutment portion 48. Accordingly, the first abutment portion 48 is joined by frictional heat (see FIG. 10).

During this process, the pressing force is applied to the first abutment portion 48 in the direction toward the opening 99 provided on the first backing jig 88. Therefore, a back surface portion of the first buffer member 98 and a part of the first abutment portion 48 are deformed to protrude toward the inside of the opening 99. On the other hand, the probe 144 rotating at the high speed is moved relatively along the first abutment portion 48 when the rotary table 62 is rotated to perform the joining operation over the entire circumference of the first abutment portion 48 (Step S9).

When the joining operation is completed for the first abutment portion 48, the rotary table 62 is stopped, and the welding machine 140 is separated from the first abutment portion 48. Further, the first clamp jig 117 is detached, while the second clamp jig 118 is attached (Step S10). The first clamp jig 117 is removed from the body member 42 when the inner circumferential diameter is increased by separating the bolt 122 from the screw hole 119.

On the other hand, the plurality of rods 126 are attached to the outer circumferential edge portions of the support base 66 by the bolts 124. The attachment plate 130 is attached to the ends of the rods 126 by the bolts 128. The second clamp jig 118 is installed to the attachment plate 130 by the bolts 132. The second clamp jig 118 tightens and holds the outer circumferential surface at the end 42b of the body member 42.

Figure 11:
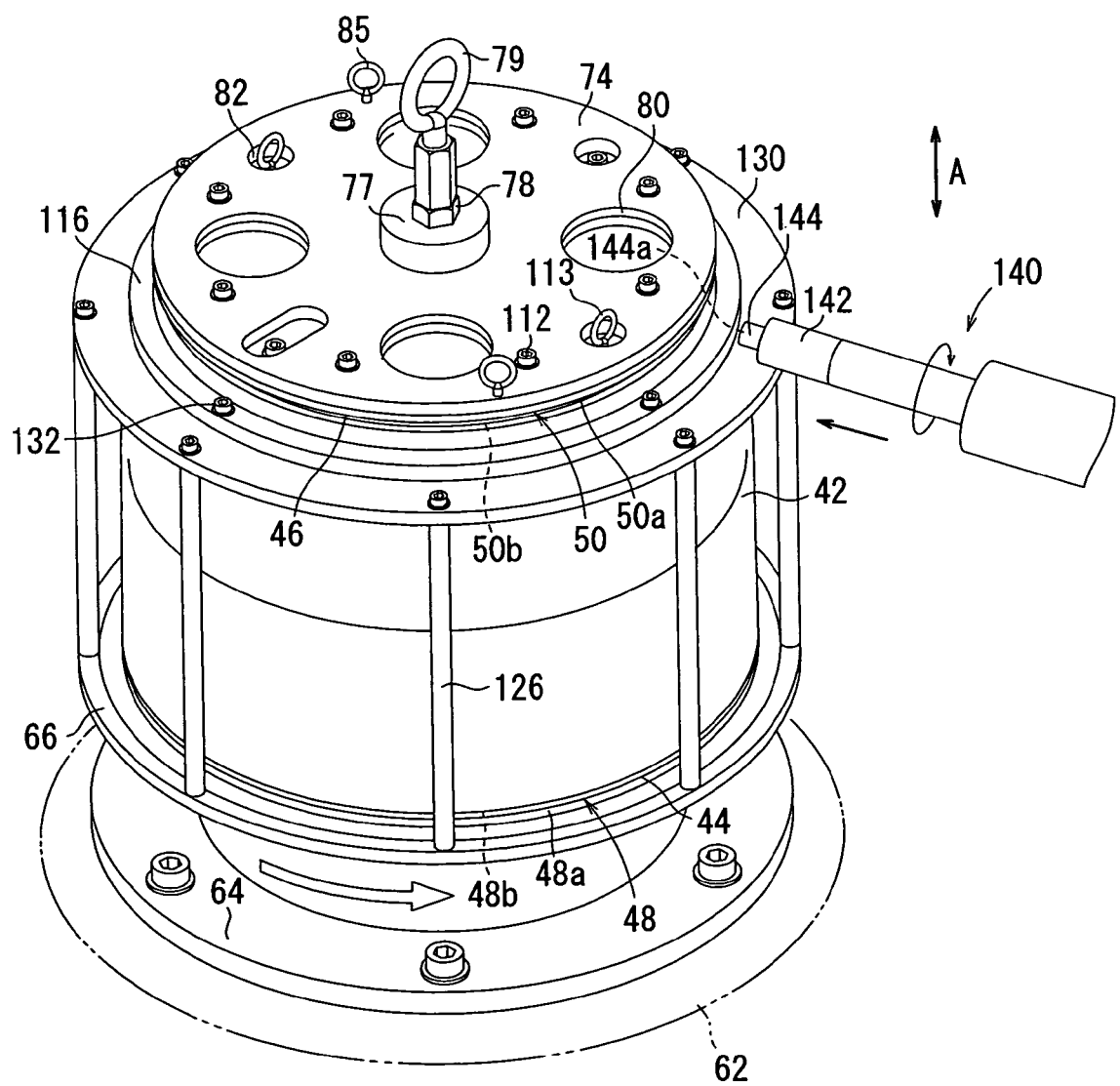
FIG. 11 illustrates the operation to be performed when a second abutment portion is joined.

In this state, as shown in FIG. 11, for example, the welding machine 140 is arranged while being opposed to the second abutment portion 50. The probe 144 is rotated together with the rotary tool 142, while the probe tip 144a of the probe 144 is inserted into the outer circumferential surface 50a of the second abutment portion 50. The second abutment portion 50 is rotated with respect to the welding machine 140 under the rotary action of the rotary table 62. The entire circumference of the second abutment portion 50 is subjected to the friction stir welding (Step S11).

Figure 12:
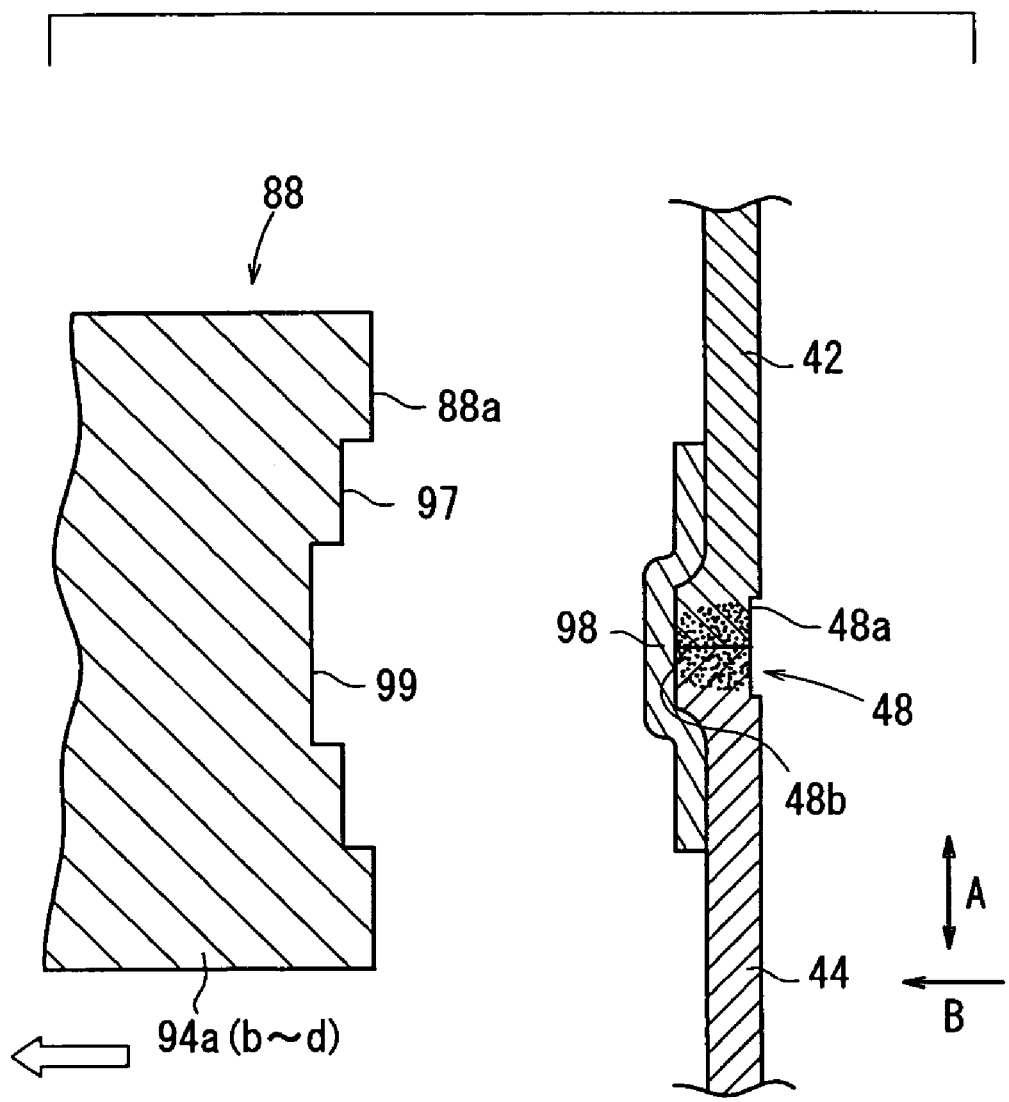
FIG. 12 illustrates the operation to be performed when the first backing jig is separated from the first abutment portion.

The first abutment portion 48 and the second abutment portion 50 are joined to one another as described above, and the duct structure 40 is obtained as a joined product. After that, the duct structure 40 is detached from the pedestal member 64 together with the first backing jig 88 and the second backing jig 92 (Step S12). Specifically, the divided jigs 94a to 94d of the first backing jig 88 are moved radially inwardly in accordance with the driving of the cylinders 96a to 96d, and the outer circumferential surface 88a is separated from the first buffer member 98 (see FIG. 12). On the other hand, the divided jigs 110a to 110d of the second backing jig 92 are moved radially inwardly in accordance with the driving of the cylinders 112a to 112d, and the outer circumferential surface 92a is separated from the second buffer member 116.

Figure 13:
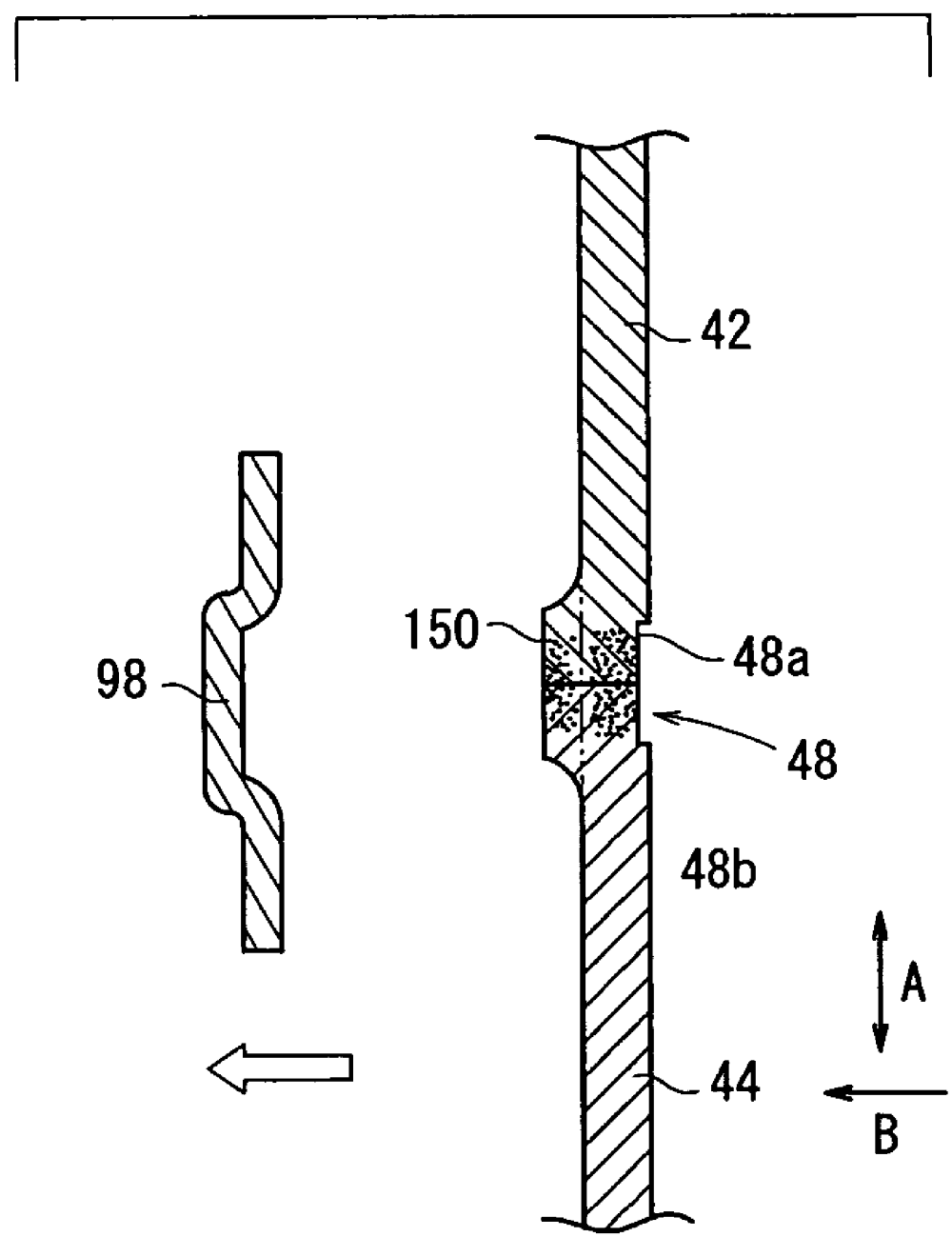
FIG. 13 illustrates the operation to be performed when a first buffer member is separated from the first abutment portion.

Accordingly, the hanging bolt 79 and the nut member 78 are separated from the screw section 72, and the pressing block 77 is detached. Further, the pressing plate 74 is detached from the support pillar 68. The duct structure 40 is removed from the support base 66 while the first buffer member 98 and the second buffer member 116 are retained on the inner circumferential surface. Subsequently, as shown in FIG. 13, as for the first abutment portion 48, the first buffer member 98 is disengaged from the inner circumferential surface of the duct structure 40 (Step S13).

A projection 150 protrudes on the inner circumferential surface of the duct structure 40 toward the opening 99 corresponding to the first abutment portion 48. The projection 150 is removed from the inner circumferential surface, for example, by means of the cutting machining (Step S14). As for the second abutment portion 50, the operation is performed in the same manner as for the first abutment portion 48.

As described above, in the first embodiment, the recessed sections 97, 114, which correspond to the first abutment portion 48 and the second abutment portion 50, are formed respectively on the outer circumferential surface 88a of the first backing jig 88 and the outer circumferential surface 92a of the second backing jig 92. The first buffer member 98 and the second buffer member 116 are installed to the recessed sections 97, 114, respectively. Accordingly, the friction stir welding is performed for the outer circumferential surface 48a of the first abutment portion 48 and the outer circumferential surface 50a of the second abutment portion 50 while the first buffer member 98 and the second buffer member 116 are in close contact with the inner circumferential surface 48b of the first abutment portion 48 and the inner circumferential surface 50b of the second abutment portion 50.

During this process, the probe tip 144a of the probe 144 rotating at the high speed is inserted into each of the outer circumferential surface 48a of the first abutment portion 48 and the outer circumferential surface 50a of the second abutment portion 50. Further, the probe tip 144a is maintained at the position separated from each of the first buffer member 98 and the second buffer member 116 (see FIG. 10). Therefore, the first abutment portion 48 and the second abutment portion 50 are not stuck to the first backing jig 88 and the second backing jig 92. The first backing jig 88 and the second backing jig 92 are free from breakage even when the first backing jig 88 and the second backing jig 92 are released from the duct structure 40. Therefore, the first backing jig 88 and the second backing jig 92 can be utilized repeatedly and economically.

Figure 10:
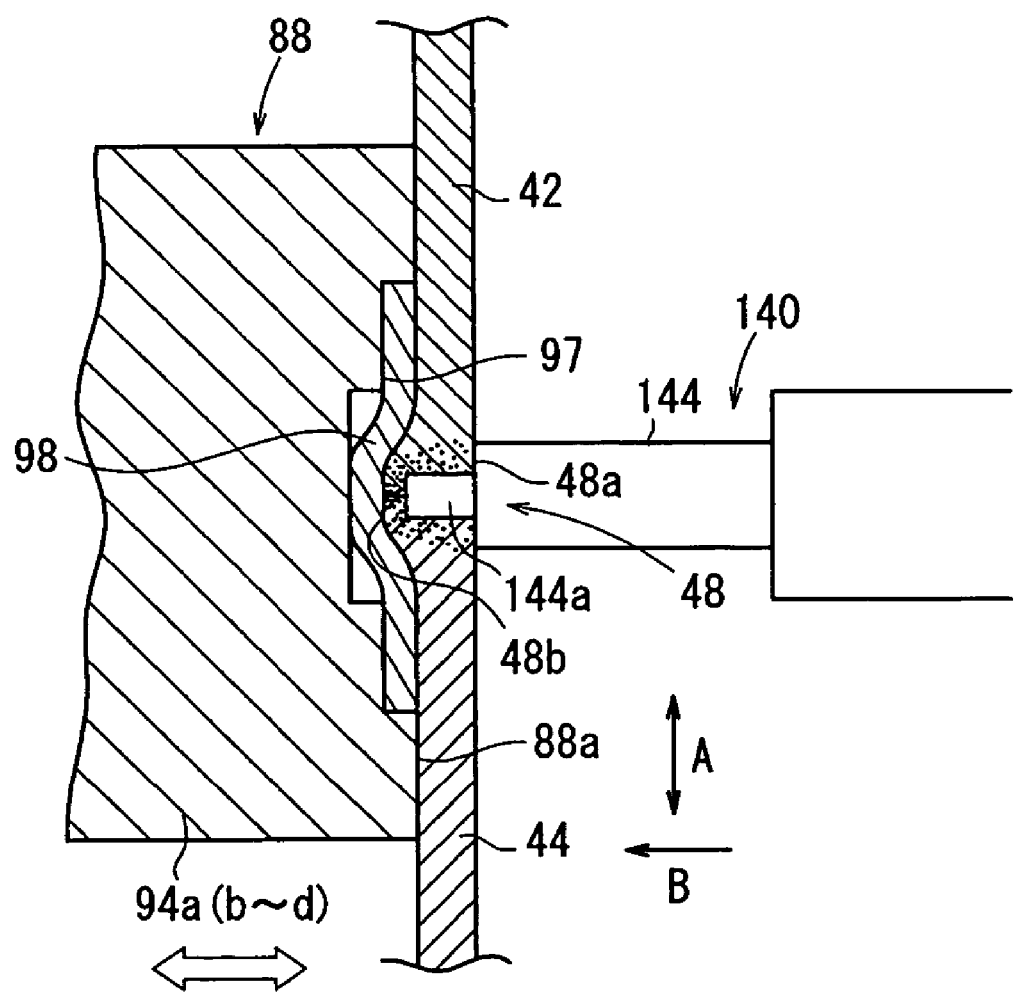
FIG. 10 illustrates, in cross section, the operation to be performed when the first abutment portion is joined.

Further, as shown in FIG. 10, the circumscribing recessed section 97 is provided on the outer circumferential surface 88a of the first backing jig 88 corresponding to the inner circumferential surface 48b of the first abutment portion 48. Also, the circumscribing opening 99, which is communicated with the bottom of the recessed section 97, is formed. The first buffer member 98 is attached to the recessed section 97. When the probe tip 144a is inserted from the outer circumferential surface 48a of the first abutment portion 48, the first buffer member 98 and a part of the inner circumferential surface 48b of the first abutment portion 48 are deformed and protrude toward the opening 99.

Figure 14:
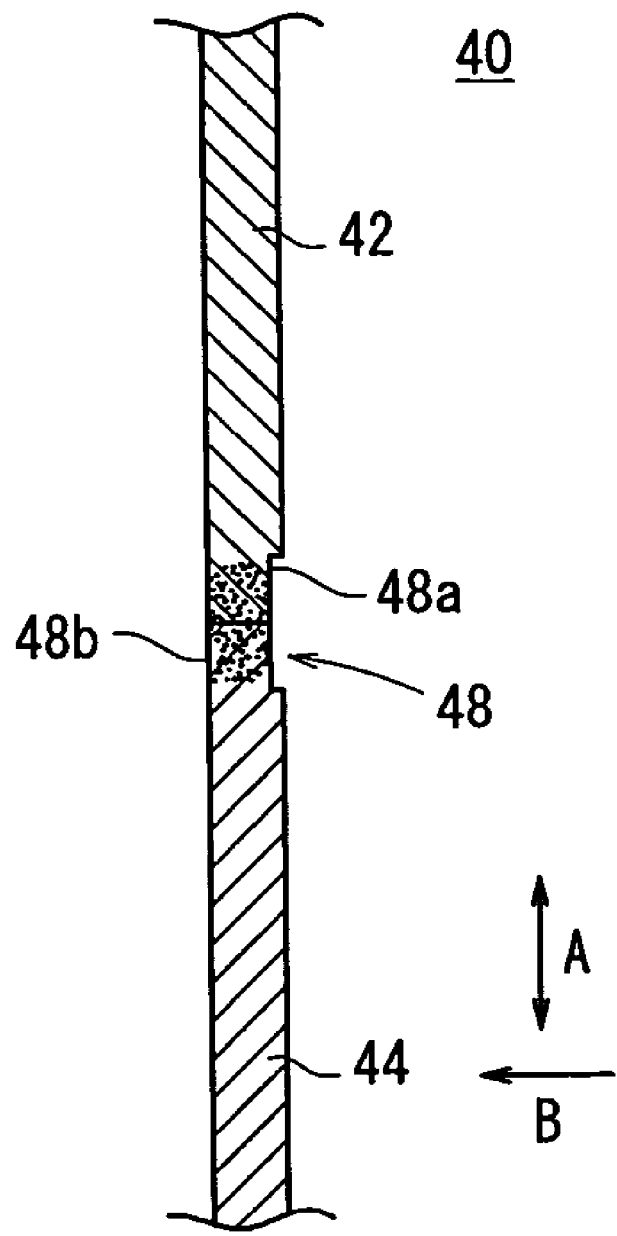
FIG. 14 illustrates the operation to be performed when an unjoined portion is removed from the first abutment portion.

Accordingly, the projection 150 is formed by the deformation and the protrusion toward the opening 99 on the side of the inner circumferential surface 48b at which the probe tip 144a does not arrive and at which any unjoined portion tends to appear due to the influence of the circumferential speed of the probe tip 144a. The projection 150 is removed from the inner circumferential surface 48b, for example, by means of the cutting machining after the friction stir welding (see FIGS. 13 and 14).

Therefore, the unjoined portion can be reliably removed from the duct structure 40. Accordingly, the strength of the joined portion is increased, and thus it is possible to improve the reliability.

The first abutment portion 48 and the second abutment portion 50 are not joined to the first buffer member 98 and the second buffer member 116. The first buffer member 98 and the second buffer member 116 can be disengaged with ease. Residual strain, which would be otherwise caused by the exfoliation of the first buffer member 98 and the second buffer member 116, does not appear in the duct structure 40.

In particular, the outer circumferential surface 88a of the first backing jig 88 and the outer circumferential surface 92a of the second backing jig 92 are formed to be completely circular. The completely circular shapes are maintained by the close contact with the outer circumferential surfaces 88a, 92a in relation to the inner circumferential surface 48b of the first abutment portion 48 and the inner circumferential surface 50b of the second abutment portion 50. Further, the inner circumferential lengths of the respective ends 42a, 44a and the circumferential lengths of the ends 42b, 46a are the identical lengths.

Accordingly, even when the first abutment portion 48 and the second abutment portion 50 each of which is thin with the thickness of not more than 2 mm and each of which has the relatively large diameter, any phase difference does not appear, which would be otherwise caused, for example, by deformation and wrinkles. The circularity can be maintained suitably for the first abutment portion 48 and the second abutment portion 50, and thus the dimensional accuracy is improved. That is, the friction stir welding can be efficiently performed for the first abutment portion 48 and the second abutment portion 50 in accordance with the simple and economical steps.

The first abutment portion 48 and the second abutment portion 50 are fitted and in close contact with the outer circumferential surface 88a of the first backing jig 88 and the outer circumferential surface 92a of the second backing jig 92 with the first buffer member 98 and the second buffer member 116. Accordingly, the positions can be correctly adjusted by avoiding any deviation of the first abutment portion 48 and the second abutment portion 50. Thus, the friction stir welding is efficiently performed.

During this process, the first abutment portion 48 and the second abutment portion 50 are fitted on the first backing jig 88 and the second backing jig 92 while the inner circumferential diameters are expanded by the thermal expansion by being heated to the predetermined temperature. Therefore, the first abutment portion 48 and the second abutment portion 50 are successfully in close contact with the outer circumferential surface 88a of the first backing jig 88 and the outer circumferential surface 92a of the second backing jig 92 reliably and easily.

The pressing force is applied by the pressing mechanism 70 to the body member 42 and the flange members 44, 46 in the direction (directions of the arrow A) substantially perpendicular to the direction of insertion of the probe 144 (direction of the arrow B). Accordingly, the first abutment portion 48 and the second abutment portion 50 can be reliably joined under pressure without forming any gaps. It is possible to obtain the high quality joined portion, and the pressing mechanism 70 can be simple structure.

In the first embodiment described above, the body member 42 and the flange members 44, 46, which are temporarily joined with the unillustrated aluminum tapes, are installed to the first backing jig 88 and the second backing jig by expanding the inner circumferential diameters by being heated to the predetermined temperature in the heating furnace. However, there is no limitation thereto. For example, the first backing jig 88 and the second backing jig 92 may be cooled to reduce the outer diameters of the first backing jig 88 and the second backing jig 92.

In the first embodiment described above, the divided jigs 94a to 94d, 110a to 110d, which are divided into four, are used. However, the number of division is variously selectable. Further, a driving source such as an electromagnetic solenoid may be used in place of the cylinders 96a to 96d, 112a to 112d. Further, the divided jigs 94a to 94d (and/or the divided jigs 110a to 110d) can be moved back and forth integrally by using a single driving source.

Figure 15:
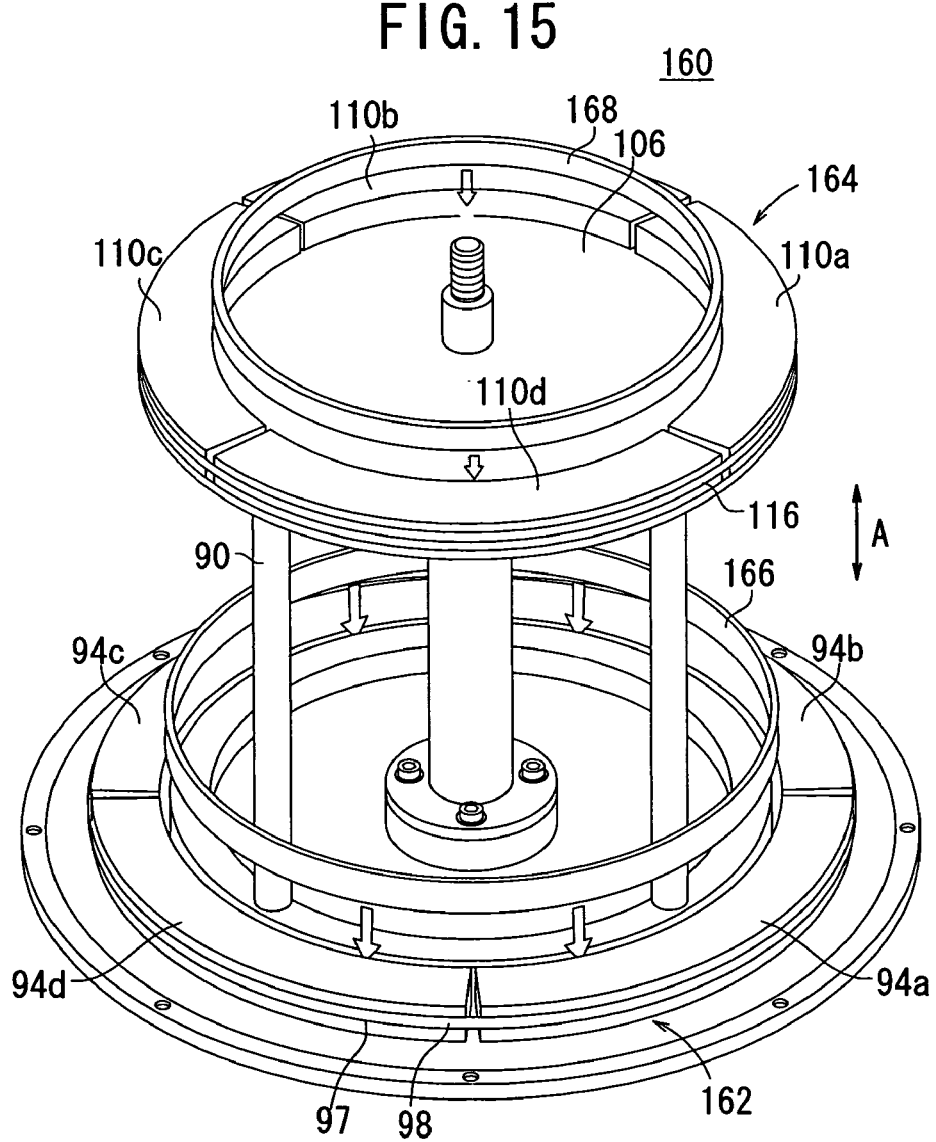
FIG. 15 is a partial perspective view illustrating a friction stir welding apparatus according to a second embodiment of the present invention.

FIG. 15 shows a partial perspective view illustrating a friction stir welding apparatus 160 according to a second embodiment of the present invention. The constituent elements that same as those of the friction stir welding apparatus 60 according to the first embodiment are designated by the same reference numerals, and detailed explanation thereof will be omitted.

The friction stir welding apparatus 160 is provided with a first backing jig 162 and a second backing jig 164. The first backing jig 162 includes a plurality of (for example, four) divided jigs 94a to 94d each of which is formed of, for example, an iron-based material, and a first ring member 166 which is arranged at the inside of the divided jigs 94a to 94d and which diametrally expands the divided jigs 94a to 94d. In the same manner as the first backing jig 162, the second backing jig 164 includes a plurality of (for example, four) divided jigs 110a to 110d each of which is formed of, for example, an iron-based material, and a second ring member 168 which is arranged at the inside of the divided jigs 110a to 110d and which diametrally expands the divided jigs 110a to 110d.

The friction stir welding apparatus 160 constructed as described above is operated as follows. The first ring member 166 is inserted into the inside of the divided jigs 94a to 94d while the first buffer member 98 is arranged on the outer circumferences of the divided jigs 94a to 94d of the first backing jig 162. Accordingly, the divided jigs 94a to 94d are diametrally expanded, and the first ring member 166 is held in close contact with the inner circumferences of the divided jigs 94a to 94d. Similarly, when the second ring member 168 is inserted into the inside of the divided jigs 110a to 110d of the second backing jig 164, the second buffer member 116 is retained in close contact with the outer circumferences of the divided jigs 110a to 110d.

Therefore, the same effect as that obtained in the first embodiment can be obtained in the second embodiment. Further, the second embodiment is advantageous in that the structure is further simplified. Wedge members may be used, for example, in place of the first ring member 166 and the second ring member 168.

Figure 16:
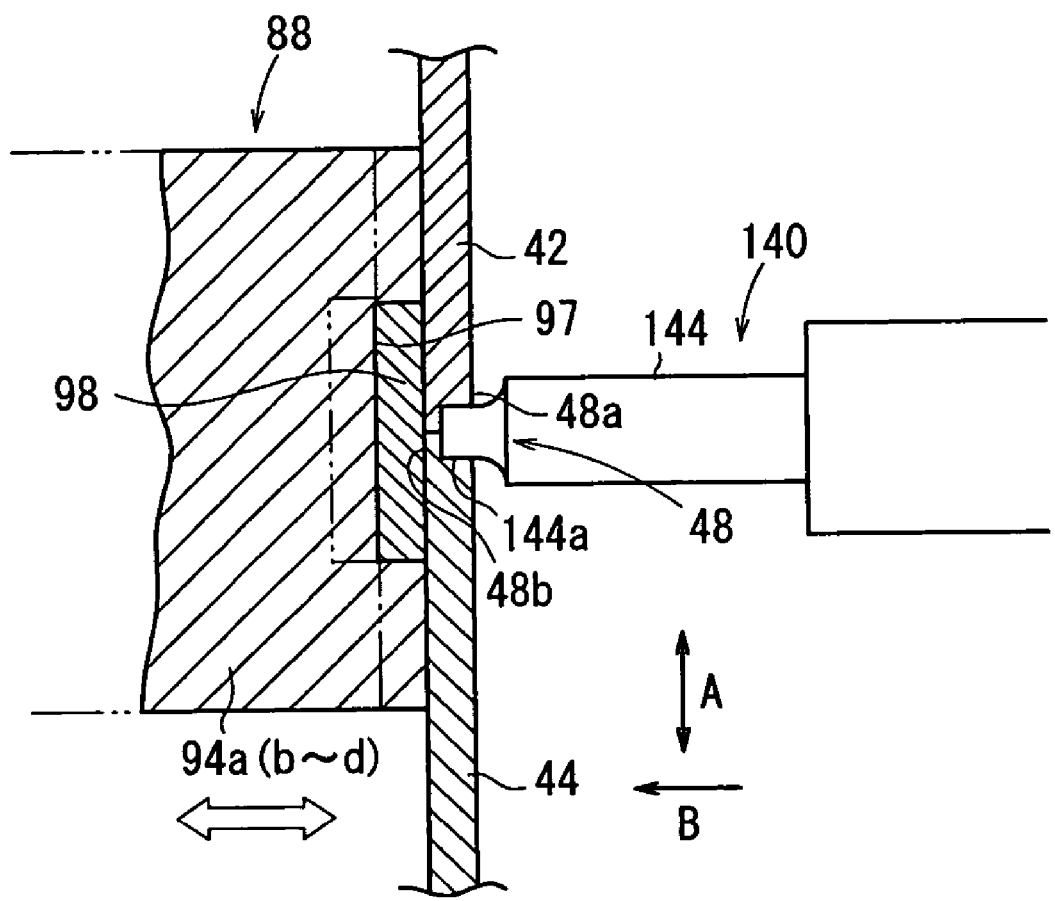
FIG. 16 illustrates, in cross section, the operation to be performed when a first abutment portion is joined by using a first backing jig on which no opening is provided.

The embodiment described above has been explained as exemplified by the case in which the opening 99 is provided for the first backing jig 88 and the opening 115 is provided for the second backing jig 92. However, the friction stir welding may be performed without providing the opening 99 for the first backing jig 88 as shown in FIG. 16. Of course, the friction stir welding may be performed without providing the opening 115 for the second backing jig 92.

Figure 17:
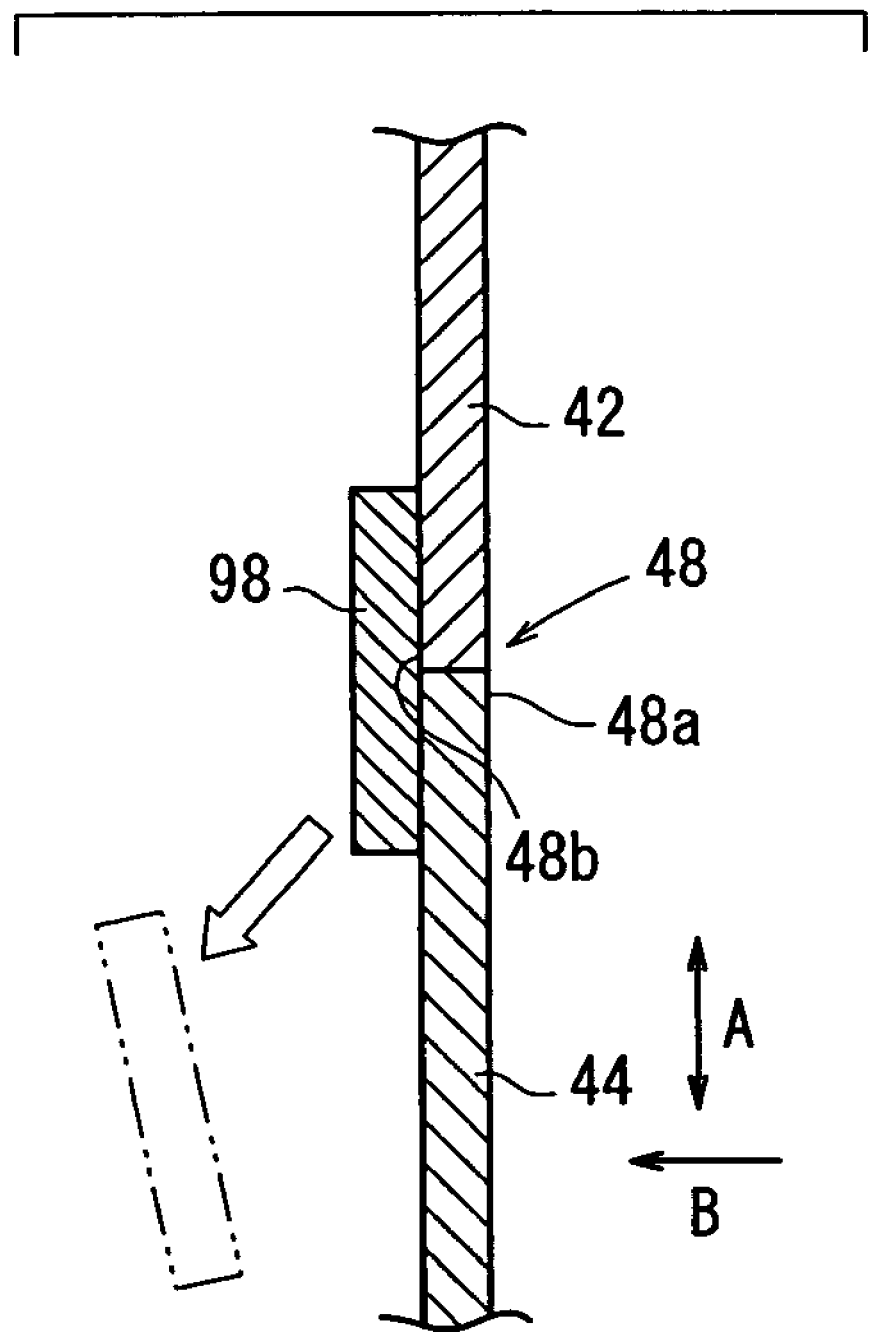
FIG. 17 illustrates the operation to be performed when a buffer member is separated from the first abutment portion shown in FIG. 16.
Figure 18:
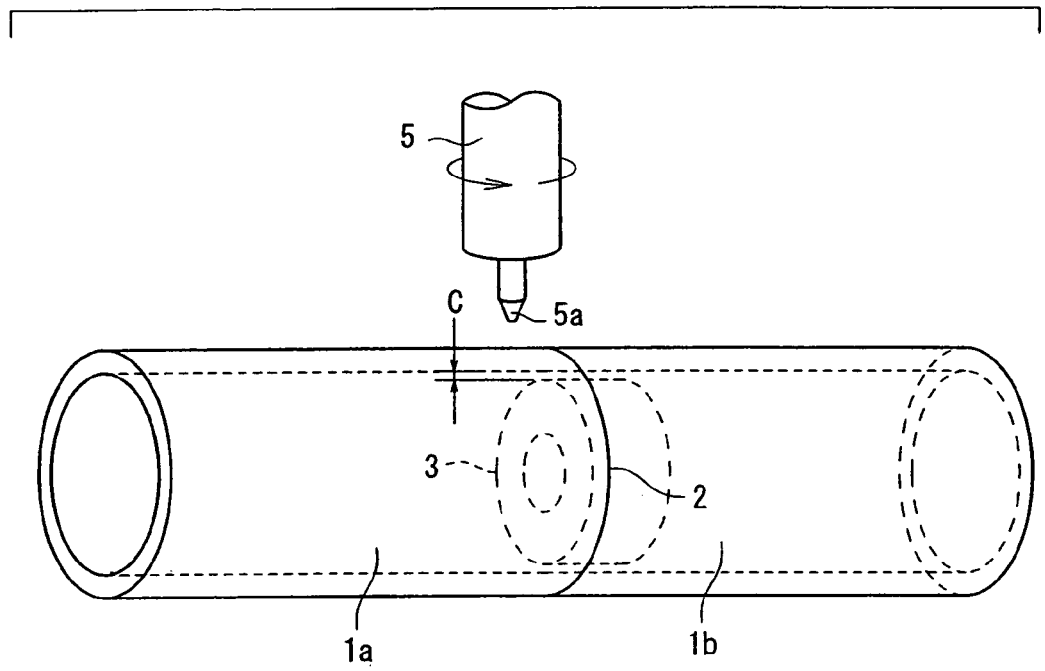
FIG. 18 illustrates a method of joining aluminum members as described in Japanese Laid-Open Patent Publication No. 11-226759.
Figure 19:
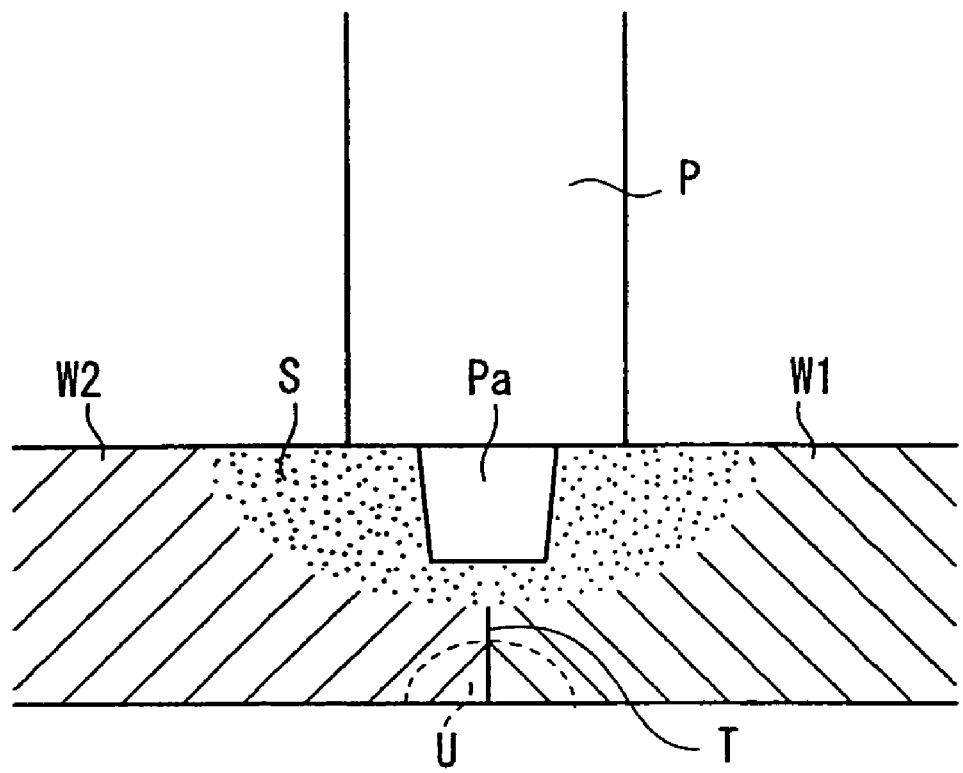
FIG. 19 illustrates an unjoined portion formed by the friction stir welding.
Figure 20:
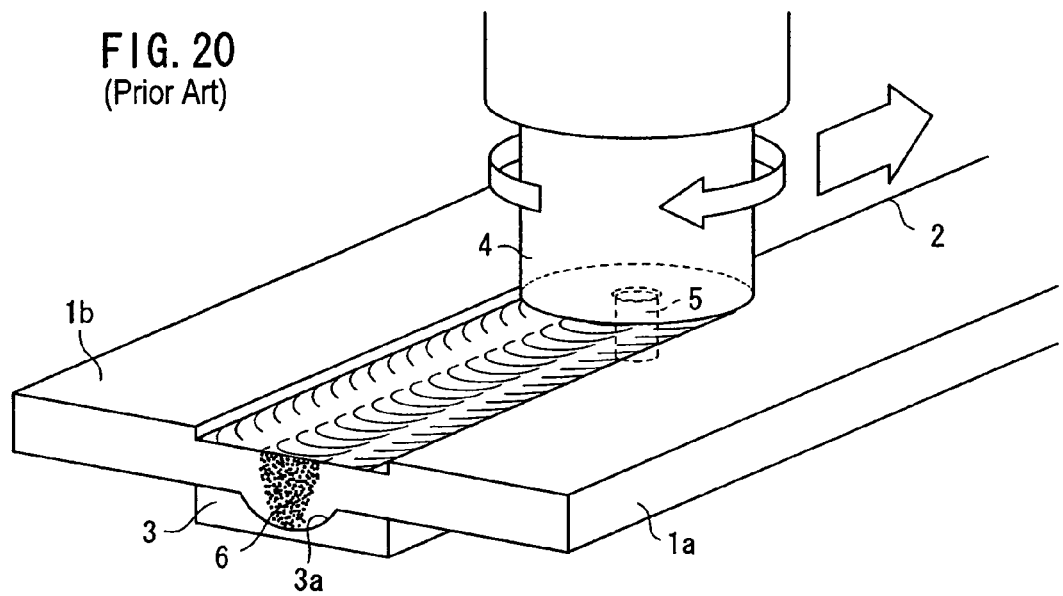
FIG. 20 illustrates a method of joining aluminum members as described in Japanese Laid-Open Patent Publication No. 10-225780.

In this case, the first buffer member 98 and the second buffer member 116 are removed from the inner circumferential surface of the duct structure 40 in Step S13 as shown in FIG. 17.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A friction stir welding method of joining an abutment portion by moving a rotating probe relatively along said abutment portion while pressing said probe against one surface of said abutment portion at which an end of a first cylindrical member and an end of a second cylindrical member are butted together, said friction stir welding method comprising the steps of:

attaching a buffer member to a backing jig which holds another surface of said abutment portion so that an opening of said backing jig formed corresponding to said abutment portion is covered therewith, said buffer member being deformable and having a shape corresponding to the shape of the first and second cylindrical members;

arranging said first cylindrical member and said second cylindrical member on said backing jig while said first cylindrical member and said second cylindrical member are relatively expanded as compared with said backing jig;

performing friction stir welding along said abutment portion by inserting said probe from said one surface of said abutment portion and deforming said buffer member and a part of said abutment portion to protrude toward said opening, while said first cylindrical member and said second cylindrical member are held by said backing jig; and removing a portion protruding from said abutment portion toward said opening after performing said friction stir welding.

2. The friction stir welding method according to claim 1, further comprising the steps of:

disengaging only said backing jig from said abutment portion while said buffer member is forcibly secured to said other surface of said abutment portion, and said first cylindrical member and said second cylindrical member are relatively expanded as compared with said backing jig after performing said friction stir welding;

disengaging said buffer member from said other surface of said abutment portion; and removing said protruding portion protruding from said abutment portion toward said opening.

3. The friction stir welding method according to claim 1, wherein said other surface of said abutment portion is in close contact with an outer circumferential surface of said backing jig, and thus said ends of said first cylindrical member and said second cylindrical member have an identical length.

4. The friction stir welding method according to claim 1, wherein said backing jig has a completely circular outer circumferential surface, and said backing jig comprises a plurality of divided jigs and said divided jigs are movable back and forth in radial directions, and said buffer member has a ring shape, each of said divided jigs has a circumscribing recessed section which has a bottom communicating with said opening and which is provided corresponding to said other surface of said abutment portion, and said ends of said first cylindrical member and said second cylindrical member which are in close contact with an outer circumferential surface of said backing jig have an identical circumferential length while said ring-shaped buffer member is integrally attached to said respective recessed sections.

5. The friction stir welding method according to claim 1, wherein said first cylindrical member and said second cylindrical member are welded by said friction stir welding along said abutment portion while a pressing force is applied in a direction substantially perpendicular to a direction of insertion of said probe.

6. The friction stir welding method according to claim 1, wherein each of said first cylindrical member and said second cylindrical member has a thickness of not more than 2 mm.

7. A friction stir welding method of joining an abutment portion by moving a rotating probe relatively along said abutment portion while pressing said probe against one surface of said abutment portion at which an end of a first cylindrical member and an end of a second cylindrical member are butted together, said friction stir welding method comprising the steps of:

attaching a buffer member to a backing jig which holds another surface of said abutment portion corresponding to said abutment portion, said buffer member being deformable and having a shape corresponding to the shape of the first and second cylindrical members; and performing friction stir welding along said abutment portion by inserting said probe from said one surface of said abutment portion and maintaining a tip of said probe at a position separated from said buffer member while said first cylindrical member and said second cylindrical member are held by said backing jig, and said first cylindrical member and said second cylindrical member are relatively expanded as compared with said backing jig.

8. The friction stir welding method according to claim 7 further comprising the steps of:

disengaging only said backing jig from said abutment portion while said buffer member is forcibly secured to said other surface of said abutment portion and said first cylindrical member and said second cylindrical member are relatively expanded as compared with said backing jig after performing said friction stir welding; and disengaging said buffer member from said other surface of said abutment portion.

9. The friction stir welding method according to claim 7 wherein said other surface of said abutment portion is in close contact with an outer circumferential surface of said backing jig, and thus said ends of said first cylindrical member and said second cylindrical member have an identical length.

10. The friction stir welding method according to claim 7 wherein said backing jig has a completely circular outer circumferential surface, said backing jig comprises a plurality of divided jigs and said divided jigs are movable back and forth in radial directions, and said buffer member has a ring shape, and each of said divided jigs has a circumscribing recessed section which is provided corresponding to said other surface of said abutment portion, and said ends of said first cylindrical member and said second cylindrical member which are in close contact with an outer circumferential surface of said backing jig have an identical circumferential length while said ring-shaped buffer member is integrally attached to said recessed sections.

11. The friction stir welding method according to claim 9 wherein said first cylindrical member and said second cylindrical member are welded by said friction stir welding along said abutment portion while a pressing force is applied in a direction substantially perpendicular to a direction of insertion of said probe.

12. The friction stir welding method according to claim 7 wherein each of said first cylindrical member and said second cylindrical member has a thickness of not more than 2 mm.

13. A friction stir welding apparatus for joining an abutment portion by moving a rotating probe relatively along said abutment portion while pressing said probe against one surface of said abutment portion at which an end of a first cylindrical member and an end of a second cylindrical member are butted together, said friction stir welding apparatus comprising:

a backing jig which holds another surface of said abutment portion where said first cylindrical member and said second cylindrical member are arranged and which is to be disengaged from said other surface of said abutment portion after performing friction stir welding, said backing jig including a recessed section which corresponds to said other surface of said abutment portion, and an opening which is communicated with a bottom of said recessed section, wherein a buffer member, which is to be disengaged from said other surface of said abutment portion after performing said friction stir welding, is attached to said recessed section, said buffer member being deformable and having a shape corresponding to the shape of the first and second cylindrical members, and said buffer member and a part of said abutment portion are deformed to protrude in said opening during said friction stir welding.

14. The friction stir welding apparatus according to claim 13 wherein said other surface of said abutment portion is arranged in close contact with an outer circumferential surface of said backing jig, and thus said ends of said first cylindrical member and said second cylindrical member have an identical length.

15. The friction stir welding apparatus according to claim 13 wherein said backing jig has a completely circular outer circumferential surface, and said ends of said first cylindrical member and said second cylindrical member, which are fitted to and in close contact with said outer circumferential surface, have an identical circumferential length.

16. The friction stir welding apparatus according to claim 15 wherein said backing jig is provided with a plurality of divided jigs and said divided jigs are movable back and forth in radial directions; and said buffer member has a ring-shaped configuration capable of being integrally fitted to respective recessed sections which are formed on said respective divided jigs.

17. The friction stir welding apparatus according to claim 13 further comprising a pressing mechanism which applies a pressing force to said first cylindrical member and said second cylindrical member in a direction substantially perpendicular to a direction of insertion of said probe.

18. The friction stir welding apparatus according to claim 13 wherein each of said first cylindrical member and said second cylindrical member has a thickness of not more than 2 mm.

19. A friction stir welding apparatus for joining an abutment portion by moving a rotating probe relatively along said abutment portion while pressing said probe against one surface of said abutment portion at which an end of a first cylindrical member and an end of a second cylindrical member are butted together, said friction stir welding apparatus comprising:

a backing jig which holds another surface of said abutment portion where said first cylindrical member and said second cylindrical member are arranged and which is to be disengaged from said other surface of said abutment portion after performing friction stir welding, said backing jig including a recessed section which is provided corresponding to said other surface of said abutment portion, wherein a buffer member, which is to be disengaged from said other surface of said abutment portion after performing said friction stir welding, is attached to said recessed section, said buffer member being deformable and having a shape corresponding to the shape of the first and second cylindrical members.

20. The friction stir welding apparatus according to claim 19 wherein said other surface of said abutment portion is arranged in close contact with an outer circumferential surface of said backing jig, and thus said ends of said first cylindrical member and said second cylindrical member have an identical length.

21. The friction stir welding apparatus according to claim 19 wherein said backing jig has a completely circular outer circumferential surface, and said ends of said first cylindrical member and said second cylindrical member, which are fitted to and in close contact with said outer circumferential surface, have an identical circumferential length.

22. The friction stir welding apparatus according to claim 21 wherein said backing jig is provided with a plurality of divided jigs and said divided jigs are movable back and forth in radial directions, and said buffer member has a ring-shaped configuration capable of being integrally fitted to respective recessed sections which are formed on said divided jigs.

23. The friction stir welding apparatus according to claim 21 further comprising a pressing mechanism which applies a pressing force to said first cylindrical member and said second cylindrical member in a direction substantially perpendicular to a direction of insertion of said probe.

24. The friction stir welding apparatus according to claim 21 wherein each of said first cylindrical member and said second cylindrical member has a thickness of not more than 2 mm.

* * * * *